United States Patent
Siessegger et al.

(10) Patent No.: US 10,891,754 B2
(45) Date of Patent: Jan. 12, 2021

(54) LIGHT-BASED VEHICLE POSITIONING FOR MOBILE TRANSPORT SYSTEMS

(71) Applicants: OSRAM SYLVANIA Inc., Wilmington, MA (US); OSRAM GmbH, Munich (DE)

(72) Inventors: Bernhard Siessegger, Unterschleissheim (DE); Yang Li, Georgetown, MA (US); Christian Breuer, North Rhine-Westphalia (DE); Christoph Pietz, Lippstadt (DE)

(73) Assignee: OSRAM SYLVANIA Inc., Wilmington, MA (US)

( * ) Notice: Subject to any disclaimer, the term of this patent is extended or adjusted under 35 U.S.C. 154(b) by 250 days.

(21) Appl. No.: 15/779,608

(22) PCT Filed: Dec. 5, 2016

(86) PCT No.: PCT/US2016/064940
§ 371 (c)(1),
(2) Date: May 29, 2018

(87) PCT Pub. No.: WO2017/096360
PCT Pub. Date: Jun. 8, 2017

(65) Prior Publication Data
US 2018/0350098 A1    Dec. 6, 2018

Related U.S. Application Data

(60) Provisional application No. 62/262,656, filed on Dec. 3, 2015.

(51) Int. Cl.
*G06T 7/73* (2017.01)
*G06K 9/46* (2006.01)
(Continued)

(52) U.S. Cl.
CPC .............. *G06T 7/73* (2017.01); *G06K 9/4661* (2013.01); *G06T 7/50* (2017.01); *G06T 7/70* (2017.01);
(Continued)

(58) Field of Classification Search
CPC ........ G06K 9/4661; G06T 2207/10048; G06T 2207/30252; G06T 7/50; G06T 7/70; G06T 7/73
See application file for complete search history.

(56) References Cited

U.S. PATENT DOCUMENTS 7,973,819 B2 * 7/2011 Shimada .................... G01S 5/16
348/208.14
9,791,865 B2 * 10/2017 Kelso ............... G06K 19/06056
(Continued)

FOREIGN PATENT DOCUMENTS

EP    2026086 A2    2/2009
JP    105257527 A    10/1993
(Continued)

OTHER PUBLICATIONS

Grantham K.H. Pang, et al., "LED Location Beacon System Based on Processing of Digital Images", IEEE Transactions on Intelligent Transportation Systems, IEEE, Piscataway NJ, USA, vol. 2, No. 3, Sep. 1, 2001 (pp. 135-150).
(Continued)

*Primary Examiner* — Bobbak Safaipour
(74) *Attorney, Agent, or Firm* — Yutian Ling

(57) ABSTRACT

Techniques and architecture are disclosed for mobile transport systems configured to determine vehicle positions within an area using light-based communication signals. The system includes a plurality of luminaires located in an area and configured to transmit luminaire position data recognizable by a sensor disposed on a vehicle. The sensor receives
(Continued)

an image of a luminaire including a light-based communication signal encoded with luminaire position data. Luminaire position data can be combined with luminaire layout information to determine a known location of the luminaire. A vehicle position relative to the known luminaire location can be determined based on mathematical relationships. Vehicle orientation relative to the area can be determined based an asymmetric fiducial pattern or multiple known luminaire locations. The system can combine a vehicle position relative to a known luminaire location with vehicle orientation relative to the area to determine a vehicle position relative to the area.

15 Claims, 20 Drawing Sheets

(51) Int. Cl.
*G06T 7/50* (2017.01)
*G06T 7/70* (2017.01)

(52) U.S. Cl.
CPC ............... *G06T 2207/10048* (2013.01); *G06T 2207/30252* (2013.01)

(56) References Cited

U.S. PATENT DOCUMENTS

| 2006/0184013 | A1  | 8/2006  | Emanuel et al. |
| 2015/0276399 | A1  | 10/2015 | Breuer et al. |
| 2017/0160371 | A1* | 6/2017  | Bockle ...................... G01S 3/78 |
| 2018/0114438 | A1* | 4/2018  | Rajagopalan .......... G08G 1/147 |
| 2018/0348338 | A1* | 12/2018 | Li .......................... G01S 1/7038 |
| 2019/0007135 | A1* | 1/2019  | Stout .................... H04B 10/114 |
| 2019/0120967 | A1* | 4/2019  | Smits ................. G01C 21/3626 |

FOREIGN PATENT DOCUMENTS

| JP | 2012164229 A  | 8/2012 |
| WO | 2015148556 A2 | 10/2015 |

OTHER PUBLICATIONS

Scholz, Volker, International Search Report and Written Opinion of the International Searching Authority, for counterpart application PCT/US2016/064940, dated May 17, 2017, European Patent Office, Rijswijk, The Netherlands, 16 pages.

Machine Translation in English language of Japanese Patent Application No. JPH05257527 generated by Espacenet Patent Search (11 pages).

Machine Translation in English language of Japanese Patent Application No. JP2012164229 generated by Espacenet Patent Search (29 pages).

* cited by examiner

LIGHT-BASED VEHICLE POSITIONING FOR MOBILE TRANSPORT SYSTEMS

CROSS-REFERENCE TO RELATED APPLICATION

The present application is a National Stage application of, and claims priority of International Application No. PCT/US2016/064940 which claims the benefit of U.S. Provisional Patent Application No. 62/262,656, entitled "LIGHT-BASED VEHICLE POSITIONING FOR MOBILE TRANSPORT SYSTEMS" filed on Dec. 3, 2015, which is herein incorporated by reference in its entirety.

TECHNICAL FIELD

This disclosure relates to solid-state lighting (SSL), and more particularly to light-based communication via SSL.

BACKGROUND

Indoor positioning systems commonly use radio-frequency (RF) signals to facilitate navigation of buildings or structures. RF based positioning involves communication signals, such as ultra-wide band (UWB), BLUETOOTH®, ZIGBEE® and Wi-Fi signals, for exchanging navigation and/or positioning information with one or more users of the system. These systems often include several RF transmitters (e.g., a BLUETOOTH® Beacon) configured to communicate with users located in or about a building. To ensure sufficient access to the system, these transmitters may be positioned throughout the building.

SUMMARY

One example embodiment of the present disclosure provides a method for determining a position of a vehicle within an area, the method including receiving an image of an asymmetric fiducial pattern displayed by a luminaire within the area; determining a coordinate position of the luminaire based on the received image of the asymmetric fiducial pattern displayed by the luminaire; determining an orientation of the vehicle relative to the area based on an orientation of the asymmetric fiducial pattern in the received image; and determining the position of the vehicle relative to the area based at least in part on the determined coordinate position of the luminaire In some cases determining the position of the vehicle relative to the area is based at least in part on a vehicle position relative to the luminaire. In some other cases, determining the position of the vehicle within the area is based on a single received image of the asymmetric fiducial pattern displayed by the luminaire. In yet other cases, determining the orientation of the vehicle relative to the area comprises associating an asymmetry of the asymmetric fiducial pattern with a direction relative to the area. In some other cases, determining the coordinate position of the luminaire within the area is based on a luminaire identifier obtained from the received image of the asymmetric fiducial pattern. In yet other cases, determining the position of the vehicle relative to the luminaire includes converting the determined coordinate position of the luminaire from a three-dimensional coordinate position into a two-dimensional position. In some such cases, the position of the vehicle relative to the luminaire is converted from the three-dimensional coordinate position into the two-dimensional position by projecting a point from the three-dimensional coordinate position of the luminaire onto an image plane of a sensor and along a line of projection from the three-dimensional coordinate position of the luminaire to the sensor.

Another example embodiment of the present disclosure provides a system for determining a position of a vehicle within an area, the system including a luminaire within the area, the luminaire including a plurality of light sources configured to display an asymmetric fiducial pattern, wherein the asymmetric fiducial pattern indicates an orientation of the luminaire relative to the area; a sensor disposed on the vehicle, the sensor configured to receive an image of the asymmetric fiducial pattern; and a processor configured to determine a location of the luminaire within the area based on a received image of the asymmetric fiducial pattern, determine an orientation of the vehicle relative to the area based on the received image of the asymmetric fiducial pattern, and determine a position of the vehicle within the area based at least in part on the determined location of the luminaire and the determined orientation of the vehicle relative to the area. In some instances, the position of the vehicle within the area is based at least in part on a vehicle position relative to the luminaire. In other instances, the vehicle is an autonomous vehicle that is configured to navigate through the area using images of asymmetric fiducial patterns displayed by luminaires. In yet other instances, the asymmetric fiducial pattern is associated with a luminaire identifier, such that the processor can decode the pattern based on light intensity values of one or more pixels of the received image to determine the luminaire identifier. In some other instances, the processor is further configured to associate an asymmetry of the asymmetric fiducial pattern with a direction relative to the area. In some other instances, the luminaire includes a combination of infrared light sources and visible light sources, such that the asymmetric fiducial pattern is displayed using the infrared light sources and the area is illuminated using the visible light sources. In other instances, the system includes a computing system in communication with at least one of a plurality of luminaires and the vehicle via a network. In other instances, the processor determines a position of the vehicle within the area based on a single image of the asymmetric fiducial pattern.

Another example embodiment of the present disclosure provides a method for determining a position of a vehicle within an area, the method including receiving a first image of a first luminaire at a first location within the area, the first image including a first visible light communication signal from the first luminaire; receiving a second image of a second luminaire at a second location within the area different from the first location, wherein the second image includes a second visible light communication signal from the second luminaire; determining the first location of the first luminaire within the area based on the first visible light communication signal shown in the first image; determining the second location of the second luminaire within the area based on the second visible light communication signal shown in the second image; and determining the position of the vehicle relative to the area based on the determined first and second locations and a selected pixel of at least one of first and second images. In some cases, the selected pixel of at least one of the first and second images is determined based on a pixel located at a center pixel location within at least one of the first and second luminaires shown in the first and second images. In other cases, determining the position of the vehicle relative to the area further comprises: associating a first angle and a second angle with the selected pixel of at least one of the first and second images and corresponding to at least one of the first and second luminaires, respectively; determining a first distance in a first direction from the vehicle to the luminaire based on the first angle; determining a second distance in a second direction from the vehicle to the luminaire based on the second angle; and determining a position of the vehicle relative to the luminaire based on the determined location of at least one of the first and second luminaires, the first distance, and the second distance. In other cases, determining a first location of a first luminaire within the area further comprises: determining a portion of the first image that includes the first luminaire; analyzing the portion of the first image that includes the first luminaire to identify a visible light communication signal for the first luminaire, the visible light communication signal encoded with a luminaire identifier; and determining the location of the first luminaire based on the luminaire identifier. In yet some other cases, the portion of the first image is determined based on comparing light intensity values for individual pixels of the first image with a threshold value to distinguish between pixels associated with background objects and pixels associated with one or more luminaires. In other cases, determining the location of the luminaire using the luminaire identifier further comprises: receiving luminaire layout information for the area; and determining a coordinate location of the luminaire within the area by comparing the luminaire identifier with the luminaire layout information to identify the coordinate location. In other cases, determining the position of the vehicle relative to the area includes determining an orientation of the vehicle relative to the area based on the first location for the first luminaire and the second location of the second luminaire. In some other cases, determining a position of the vehicle relative to the area is based on a known distance between at least one of the first and second luminaires and a sensor disposed on the vehicle.

Another example embodiment of the present disclosure provides a method for determining a position of a vehicle within an area, the method including receiving an image of the area, the image including a first luminaire displaying a first visible light communication (VLC) signal and a second luminaire displaying a second VLC signal; determining a first group of pixels of the image corresponding to the first luminaire; determining a second group of pixels of the image corresponding to the second luminaire; determining a first location for the first luminaire within the area based on the first VLC signal corresponding to the first group of pixels of the image; determining a second location for the second luminaire within the area based on the second VLC signal corresponding to the second group of pixels of the image; determining an orientation of the vehicle relative to the area based on the determined first and second locations; and determining the position of the vehicle relative to the area based on at least one of the determined first and second locations and a selected pixel from one of the first group of pixels and the second group of pixels for the image.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1A:
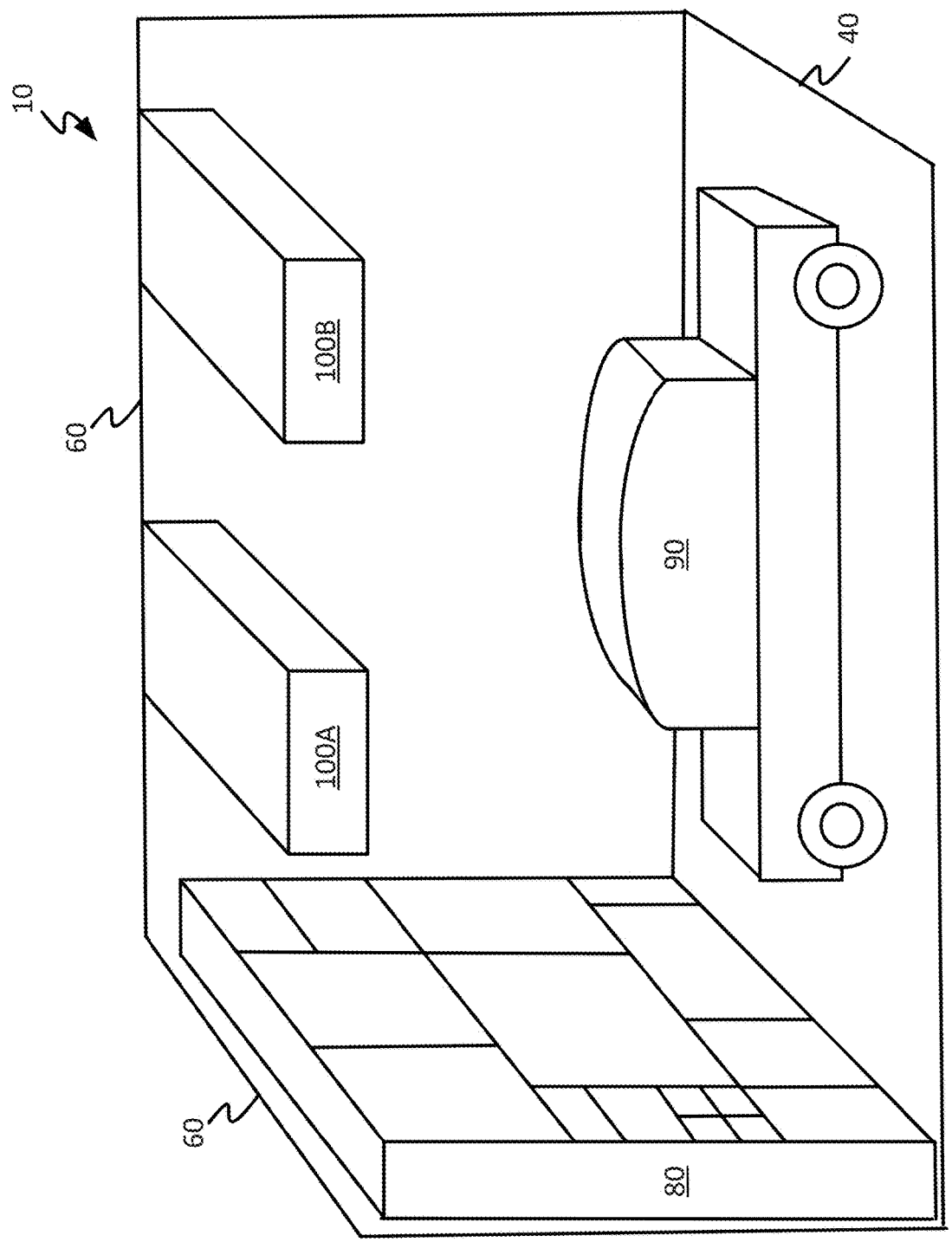
FIG. 1A is a perspective view of an area configured in accordance with an embodiment of the present disclosure.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

Techniques and architectures are disclosed for mobile transport systems configured to determine vehicle positions within an area using static light illuminations or light-based communication signals. The system includes a plurality of luminaires located in an area and configured to convey or otherwise transmit luminaire position data recognizable by a sensor disposed on a vehicle. The sensor receives an image of a luminaire and a displayed light-based communication signal in response to receiving the light-based communication signal. A vehicle position relative to the area can be determined using the image. In some applications, the luminaires display a static asymmetric fiducial pattern. The fiducial pattern illuminates the area about the luminaire, but also communicates luminaire position data (e.g., a luminaire identifier). Luminaire position data can be combined with information regarding luminaire layout within the area to determine a location of the luminaire within the area. A vehicle position relative to the luminaire can be determined based on the known luminaire location using mathematical modeling techniques. The asymmetric fiducial pattern also communicates a luminaire orientation relative to the area, which in turn can be used to determine a vehicle orientation relative to the area. Using the vehicle position relative to the luminaire and the vehicle orientation relative to the area, the system can determine a vehicle position relative to the area. Light-based communication signals, in other applications, are a visible-light communication (VLC) signals generated by modulating the light intensity of one or more light sources of a luminaire. In such applications, the system is configured to determine a luminaire location based on an image of a VLC signal transmitted by the luminaire. Luminaire location can be determined by decoding the VLC signal received by a sensor. A vehicle position relative to the known luminaire location can be determined based on a selected pixel of the image corresponding to the luminaire shown in the image. Vehicle orientation can be determined based vehicle positions relative to two or more known luminaire locations within the area. A vehicle position within the area can be determined based on the relative position of the vehicle from a known luminaire location and a determined vehicle orientation relative to the area.

General Overview

Indoor positioning systems for production or logistical applications that, for example, involve automated movement of materials and goods (e.g., in a factory or warehouse) require a high level of accuracy to ensure the precise movement of goods and/or equipment throughout an area. Such systems often involve mechanical or magnetic tracks, lasers, and visual objects (e.g., such as signs) to guide equipment through the area. Although these systems are accurate, they are typically fixed in relation to the area, and thus are not easily adjustable. As a result, changes to these systems can cause a temporary loss of system operation due to physical movement of components.

Other systems, for example radio-frequency (RF) based positioning systems, are adjustable, but are often inaccurate. In more detail, RF systems, such as UWB, BLUETOOTH®, ZIGBEE® and Wi-Fi, are often prone to errors caused by, for example multipath fading. Multipath fading occurs when an area includes surfaces and objects that can reflect transmitted RF signals creating multiple copies of the transmitted RF signal. This is particularly problematic in warehouses where a large area is filled with many potentially RF reflective surfaces. Because many of the reflected signals travel different paths, which in turn modifies properties used for navigation (e.g., attenuation, phase shift, and transmission period), a navigation receiver may receive constructively or destructively interfered signals. The receiver, thus, may incorrectly process the received positioning information and in turn provide inaccurate positioning information to a user.

Thus, and in accordance with an embodiment of the present disclosure, techniques and architectures are disclosed for a mobile transport system configured to determine vehicle position within an area using light-based communication signals. The mobile transport system may be located in an area, such as a warehouse or factory, and include a plurality luminaires disposed therein. The luminaires may be located throughout the area at unique coordinate locations relative to a reference point located within the area (e.g., one corner of the area) and relative to reference axes (e.g., x and y coordinate axes). The coordinate location of each luminaire is determined upon luminaire installation and is provided to the system. The luminaires are configured to transmit luminaire position data recognizable by a sensor disposed on the vehicle. The vehicle, in some embodiments, is a fork truck or power-driven cart configured to move goods and/or equipment throughout the area. The sensor is disposed on the vehicle, such that as the vehicle moves through the area the luminaires appear within the field of view (FOV) of the sensor. The sensor receives an image of a luminaire along with a light-based communication signal transmitted therefrom. In some embodiments, the sensor is a global shutter camera or dynamic vision sensor. Using the image received by the sensor, the system is configured to determine a vehicle position relative to the area.

The luminaires, in an example embodiment, display a static asymmetric fiducial pattern. The fiducial pattern is created with one or more light sources disposed within the luminaire and configured to transmit light to the area. Fiducial patterns can be created by positioning the light sources in a desired pattern within the luminaire and/or by varying the light intensity level of light transmitted from one or more light sources. The fiducial pattern transmitted by the light sources illuminates the area about the luminaire, but also communicates luminaire position data. Luminaire position data is information, such as a luminaire identifier, that can be used to determine vehicle position. The luminaire identifier can be combined with luminaire layout information for the area to determine a luminaire location within the area for the luminaire shown in the image.

A vehicle position relative to the area can be determined by first determining a vehicle position relative to a known luminaire location and determining an orientation of the vehicle relative to the area. For example, when a vehicle is located directly beneath a luminaire, the luminaire and the vehicle are located at the same position within the area. Thus, by determining the luminaire location, as previously described, the system also determines a vehicle position relative to the area. Vehicles, however, are rarely positioned directly beneath a luminaire. Rather, vehicles are more often located at a distance relative to a luminaire within the area. In such instances, a vehicle position relative to the luminaire can be determined based on a known luminaire location using mathematical modeling techniques, such as a pin-hole camera model. The asymmetric fiducial pattern also communicates luminaire orientation relative to the area. The system is configured to recognize the asymmetry of the fiducial pattern and associate it with direction relative to the area (e.g., a cardinal magnetic direction or an arbitrary coordinate system direction defined by the area). Vehicle orientation relative to the area can be determined based on the fiducial pattern in a received image and an orientation of the received fiducial pattern relative to the area (e.g., asymmetric fiducial pattern faces north). Combining a determined vehicle position relative to the luminaire (e.g., (x, y) coordinates) with the vehicle orientation relative to the area the system can determine a vehicle position relative to the area.

The mobile transport system, in other embodiments, communicates luminaire position data using visible-light communication (VLC) signals. VLC signals are generated by modulating one or more light sources of a luminaire. In an example embodiment, the sensor disposed on the vehicle is disposed at a constant distance from the luminaires and receives an image of a luminaire along with the received VLC signal. The VLC signal is encoded with a luminaire identifier (e.g., a luminaire identification number) that is recognizable by the system. A luminaire identifier, in some embodiments, can be encoded into a VLC by converting the identifier from a piece of information or instruction into a VLC light signal. To convert luminaire identifier into a light signal, the system can transmit a VLC light signal at a particular frequency and/or light intensity level corresponding to a particular luminaire identifier. In turn, the system is configured to decode the VLC signal to obtain the luminaire identifier. The luminaire identifier can be combined with luminaire layout information to determine a location (e.g., a coordinate position) of the luminaire within the area.

As previously described, when a vehicle is located directly beneath a luminaire, the location of the luminaire and the position of the vehicle are the same relative to the area. To determine a position of a vehicle relative to a known luminaire location (e.g., when the vehicle is positioned adjacent to the luminaire), the system is configured to determine a relative vehicle position based on a selected pixel of the image. In more detail, the system is configured to associate two angles (e.g., horizontal and vertical angles) with each pixel location of the received image. These angles are determined through calibrating the sensors disposed on the vehicles and in turn, provided or otherwise programmed into the system. The system is configured to select a pair of angles based on a selected pixel of the image corresponding to the luminaire.

The system is configured to process the image to determine pixels corresponding to a luminaire in the image. In an example embodiment, the system distinguishes between image pixels corresponding to the luminaire and other pixels corresponding to background objects by determining the light intensity value for each pixel of the received image. Background objects are objects within the FOV of the sensor that do not provide luminaire position data, such as ceiling tiles, piping, ductwork, and structural beams to name a few examples. Image pixels corresponding to a luminaire, in some embodiments, are determined based on pixel light intensity values and using a threshold. A pixel light intensity value is a number that indicates level of light for a given pixel of an image. A threshold is a pixel intensity value that can be used to distinguish between pixels associated with a luminaire and other pixels corresponding to background objects. The system is configured to identify pixels corresponding to background objects when a pixel light intensity value is below the threshold. Pixel light intensity values equal to and/or above the threshold indicate pixels corresponding to a luminaire. Numerous other image processing techniques will be apparent in light of the present disclosure.

With the image pixels corresponding to the luminaire identified, the system is further configured to select a pixel corresponding to the luminaire to determine a vehicle position relative to a known luminaire location. In an example embodiment, the system is configured to analyze the pixels of the image corresponding to a luminaire to select one pixel of the received image and corresponding to the luminaire, which in turn can be used to determine a relative vehicle position from the luminaire. The selected pixel may be determined in any one of a number of ways. For instance, in some embodiments, the local scan includes selecting a pixel by determining a pixel located at center pixel location or representing a center of mass for the luminaire shown in the image using grid analysis techniques. In other embodiments, the local scan includes selecting a pixel associated with the greatest pixel light intensity value. Once selected, the system is configured to select a pair of angles associated with the pixel location of the selected pixel. With the pixel corresponding to the luminaire and the pair of angles selected, the system is configured to determine a vehicle position relative to the luminaire. Since the sensor disposed on the vehicle is a constant distance from the luminaires, the vehicle position relative to the luminaire can be determined based on geometric relationships among the system components (e.g., the sensor and luminaire).

To determine a vehicle position relative to the area (e.g., a global coordinate position) vehicle orientation relative to the area is combined with a determined vehicle position relative to the luminaire (e.g., a local coordinate position). Without a vehicle orientation, the vehicle position relative to the luminaire may be in one of two locations (e.g., facing a first side of the luminaire or facing a second side of the luminaire). In an example embodiment, the system is configured to determine the several luminaire locations and relative vehicle distances therefrom to obtain a unique combination of luminaire locations and relative vehicle distances to determine an orientation relative to the area.

Example Mobile Transport System Application

FIG. 1A is a perspective view of an area 10 that can be any structure or spatial environment in which mobile transport systems are present, such as a warehouse or factory. In such environments, mobile transport systems, for example fork trucks or power-driven carts, move goods throughout the area 10. To position goods in a desired location, mobile transport systems are configured to determine their particular location within the area 10. The area 10 illustrated in FIG. 1 includes a floor 40, walls 60, a shelves 80, a vehicle 90 and luminaires 100A and 100B (collectively luminaires 100).

In this example, the area 10 includes a floor 40 and walls 60 for housing containers, which are stored in shelves 80. The floor 40 generally supports the vehicle 90 while the vehicle moves about the area 10. In some embodiments, the floor 40 is a flat surface and having a known distance C (shown in FIG. 2A) from the luminaires 100. The distance C can be programmed into the system for use in determining vehicle position within the area 10, as described further herein. As can be seen, the walls 60, in the example embodiment, are located along the perimeter of the floor 40 and thus define the layout of the floor 40. In other embodiments, the walls 60 are columns located throughout the floor 40. No matter their configuration, together the floor 40 and walls 60 define the area 10 in which, the vehicle 90 moves through to transport goods.

In some embodiments, the vehicle 90 can be, for example, an indoor transport such as an automated forklift or robot. For instance, an example use case is where area 10 is a large stock room or so-called fulfillment center that includes hundreds or thousands of shelves with stored goods positioned throughout the stock room in known locations, each location accessible via a robotic vehicle programmed to retrieve goods and return those goods to a packing station where a human can package the targeted good for shipment to a buyer. In other embodiments, the vehicle 90 may be an autonomous vehicle, where area 10 is a hallway or parking garage or roadway (whether indoor or outdoor). An autonomous vehicle is a vehicle that is capable of sensing its environment and navigating without human input, for example a person physically operating a set of vehicle controls. In an example embodiment, where the system is configured to communicate luminaire position data via VLC signals, the vehicle 90 is configured to move along the floor 40 (e.g., stock room floor, hallway, or roadway) at a known distance (e.g., distance Z shown in FIG. 2A) from the luminaires 100, as further described herein. In other embodiments of the present disclosure, the distance of the vehicle 90 from the luminaires 100 may not be constant. For example, in some embodiments where luminaire position data is communicated via asymmetric fiducial patterns the vehicle 90 may move in any direction (e.g., up-down, forward-backward, left-right) relative to the area 10. In addition, the receiver 208 disposed on the vehicle 90 may move relative to a centerline of the body 204 (e.g., in a pitch, yaw, roll direction). Unlike previous systems that include mechanical or magnetic track guidance systems that direct vehicle movement along pre-defined paths, the vehicle 90 is not so limited. Rather, the vehicle 90 is configured to move freely about the area 10 using positioning information provided by one or more luminaires 100. Numerous contexts and form factors for vehicle 90 will be appreciated in light of this disclosure.

The vehicle 90 navigates the area 10 using positioning information received from one or more luminaires 100. Luminaires 100 are configured to transmit light to illuminate the area 10 using one or more light sources, such as light emitting diodes (LEDs). Luminaires 100 are further configured to display an asymmetric light-based fiducial pattern for use with vehicle positioning. An asymmetric light-based fiducial pattern is a pattern of light sources configured to communicate positioning information, such as a luminaire identifier, that when decoded by the system can be used to determine a vehicle position within the area 10. The asymmetric pattern can be formed by physically arranging individual light sources within the luminaire 100 to create the pattern or operating light sources within the luminaire 100 at varying light intensity levels to create the fiducial pattern, as further described herein.

The luminaires 100 are positioned within the area 10, for example attached or otherwise secured to a ceiling, so that the luminaire 100 are visible to vehicles 90. In more detail, the luminaires 100 are positioned at a known distance above the floor 40 (e.g., distance C shown in FIG. 2A). The luminaires 100, in some embodiments, are recessed into the ceiling to maintain a desired height between the luminaire 100 and the vehicle 90. In other embodiments, the luminaires 100 are attached to a portion of the building's structure, such walls 60. In a more general sense note that the luminaires 100 may be positioned on any surface of the area 10, such that the luminaires 100 are at a known height above the floor 40 and visible to vehicles 90.

Figure 1B:
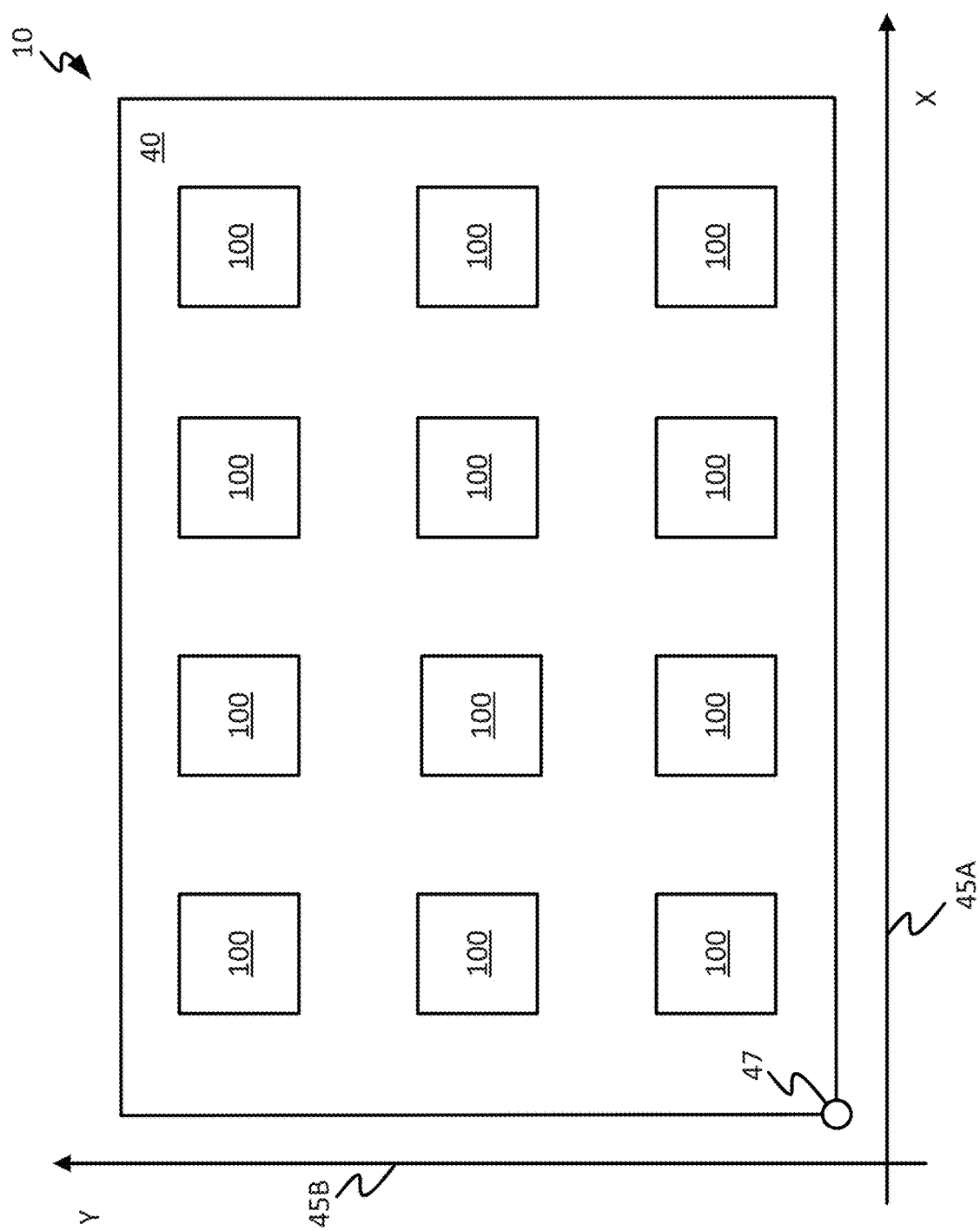
FIG. 1B is a top view of an area configured in accordance with an embodiment of the present disclosure.

FIG. 1B is a top view of an area 10 that illustrates an example arrangement of luminaires 100 illustrated in FIG. 1A. As can be seen, the luminaires 100 can be positioned throughout area 10 to provide vehicle positioning information at many different area locations. In an example embodiment, a coordinate position (e.g., (X, Y)) for each luminaire 100 in relation to the area 10 can be determined during luminaire installation using a reference frame, such as the floor 40. In an example embodiment, the luminaires 100 are located within the area using a first reference axis 45A along an X-direction and a second reference axis 45B along a Y-direction (collectively reference axes 45). The floor 40 may include, for example a reference point 47 located at a corner of the floor 40, in which luminaires 100 are positioned therefrom. The position of each luminaire 100 within the area 10 relative to a reference point is known as luminaire layout information. This information can be stored within a memory of a vehicle 90 and/or a computing system, such that the information is accessible for determining vehicle position. Once determined, the coordinate position for a luminaire 100 can be combined with other known distances (e.g., the Z distance in FIG. 2A) to determine a three-dimensional luminaire coordinate position within the area 10.

The luminaires 100 can be positioned such that several vehicles located at different positions within the area 10 can view the same luminaire 100 and receive luminaire position data, which in turn can be used to determine a unique location for each vehicle. Luminaire position data is any information, such as light communication (e.g., fiducial pattern representing a luminaire identifier), RF, and infrared (IR) signals, which can be used to determine vehicle position. As a result, a single luminaire 100 can provide its luminaire position data to multiple vehicles at one time without the vehicles 90 experiencing communication errors due to multiple received signals. In an example embodiment, the luminaires 100 are arranged in a grid pattern above the floor 40 in relation to x-y coordinate axes. In other embodiments, however, the luminaires 100 are arranged in a straight line, such as when positioned along a hallway, or an aisle way, or in a circular pattern about a central location within the area 10. In a more general sense, the luminaires 100 can be configured in any desired arrangement such that vehicles 90 can determine a vehicle position within the area 10 based on a luminaire coordinate position.

Figure 2A:
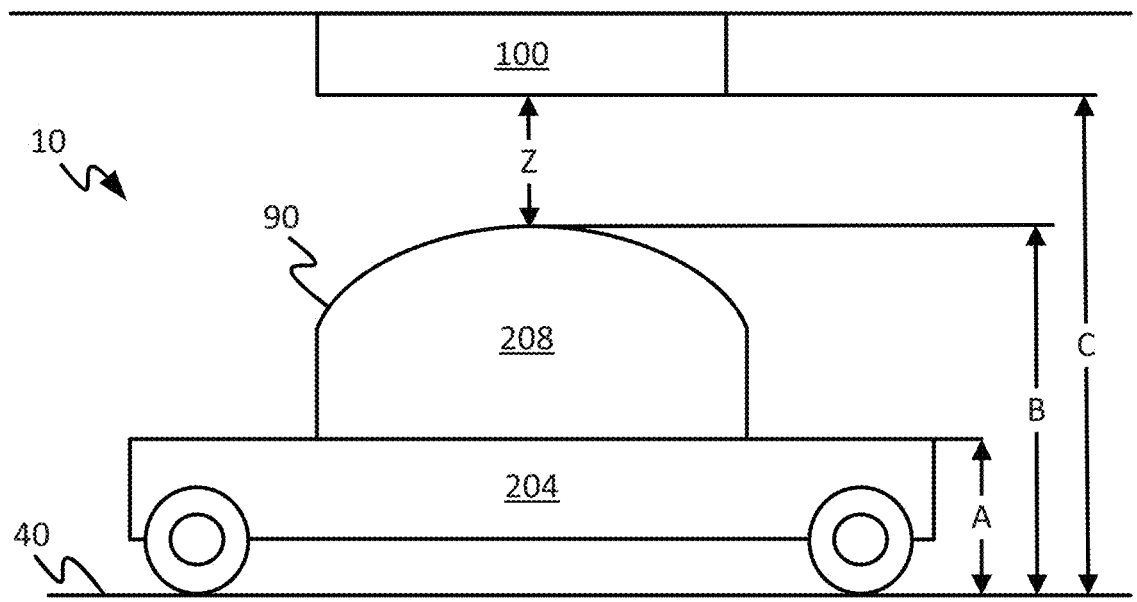
FIG. 2A is a side view of the area including a vehicle and a luminaire configured in accordance with an embodiment of the present disclosure.

FIG. 2A is a side view of the area including a vehicle 90 and a luminaire 100 configured in accordance with an embodiment of the present disclosure. The vehicle 90 includes a body 204 configured to carry goods and equipment through the area 10. In an example embodiment, the body 204 is a fork truck. In other instances, the body 204 may be a robot or a power-driven cart. The body 204, in some embodiments, maintains a constant distance, A, relative to the floor 40. Attached to the body 204, is a receiver 208 for receiving luminaire position data. The receiver 208 is located at a known distance, B, relative to the floor 40. As can be seen, the luminaire 100 is also positioned a distance, C, relative to the floor 40. Since both distances B and C are measurable and thus, known values, the distances can be used to determine a distance Z from the receiver 208 to the luminaire 100. Combining distance Z with the coordinate position of the luminaire (as described in relation to FIG. 1B), a three-dimensional location of the luminaire can be determined. The three-dimensional location of the luminaire can be programmed into the system and used to determine vehicle position relative to the luminaire, as described further herein. Note, however, that changes in distance A and/or B due to raising, lowering and/or tilting the body 204 can adversely affect the determined vehicle position.

Figure 2B:
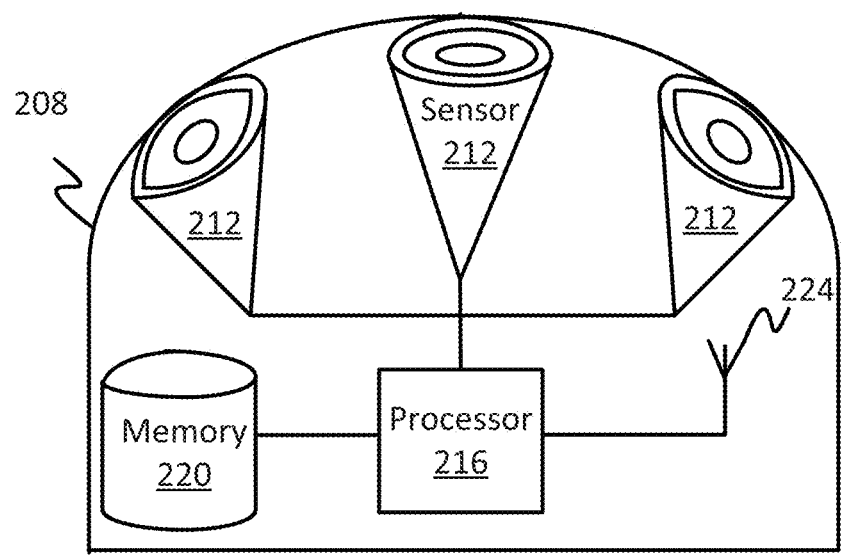
FIG. 2B is a schematic view of a receiver for the vehicle, configured in accordance with an embodiment of the present disclosure.

FIG. 2B illustrates an example receiver 208 configured in accordance with an embodiment of the present disclosure. The receiver 208 includes one or more sensors 212, a processor 216, a memory 220, and a transceiver 224 that collectively receive and process luminaire position data as the vehicle changes its position. The receiver 208 may be located anywhere on the body 204, such that at least one sensor 212 can receive the displayed fiducial pattern for a given luminaire 100. As can be seen in the example embodiment, the receiver 208 is located at the top of the vehicle 90. Other embodiments of the receiver will be apparent in light of this disclosure.

The receiver 208 includes one or more sensors 212 configured to receive or otherwise process images of a light-based fiducial pattern displayed by a given luminaire 100. In an example embodiment, sensors 212 are affixed to the body 204 to maintain the sensors 212 at a constant distance from the luminaires 100. The sensor 212, in some embodiments, is a complementary metal-oxide semiconductor (CMOS) sensor that is sensitive to light in both visible and infrared spectrums. In other embodiments, the sensors 212 may be a charge-couple device (CCD) image, a global shutter camera, or dynamic vision sensor. In a more general sense, sensors 212 can be any sensor capable withstanding the effects of industrial environments, such as continuous exposure to vibrations and use and/or capable of meeting any applicable safety standards.

The sensors 212, in some other embodiments, include filters, such as infrared or polarized filters, for detecting signals transmitted in wavelengths and/or directions different from ambient light present in the area. Filters may also reduce intensity of visible light so that the sensor 212 does not become saturated with ambient light and thus, be unable to detect the signal displayed by the luminaire 100. Tunable optical filters are implemented, in other embodiments, to create two distinct modes of operation: (1) IR light enhanced and visible light reduced and (2) visible light enhanced and IR light reduced. The filter is configured to be adjustable to improve the accuracy of the sensors 212 in one or more applications.

In addition, in some embodiments, the sensors 212 are calibrated prior to and during use. Sensor calibration can involve using sensors 212 to receive or otherwise process multiple images of a fiducial pattern at various known distances and angles. Using these known distances and angles, the receiver 208 can be adjusted to ensure a high-level accuracy is achieved when in use. Once calibrated, sensors 212 may be periodically calibrated to maintain a desired accuracy level for the system.

In response to receiving an image of the asymmetric light-based fiducial pattern, the sensors 212 transmit this data to a processor 216, which in turn is programmed or otherwise configured to compile and distribute instructions and data. For example, in some embodiments, the processor 216 is configured to determine a luminaire identifier from an asymmetric fiducial pattern of the received image. The processor is further configured to calculate a vehicle position relative to the luminaire 100 based on the determined luminaire identifier, as described further herein. To calculate vehicle position within the area 10, the processor is configured to access or otherwise run positioning firmware and software, such as routines and sub-routines, which analyze the received image to extract luminaire position data (e.g., a luminaire identifier). Once determined, the processor is configured to transfer the vehicle position data to a memory 220, where such data can be maintained for future use by the system (e.g., for vehicle tracking purposes).

As can be seen, the receiver 208 further includes a memory 220 accessible by the processor 216. In an example embodiment, the data created and/or managed by the processor 216 is stored within a memory 220 to support various operations of the vehicle 90. Data such as images, maps of the area, luminaire identifiers, and look-up tables are made accessible to the processor 216 via the memory 220 and/or a network to determine vehicle position. Memory 220 can be of any suitable type (e.g., RAM and/or ROM, or other suitable memory) and size, and in some cases may be implemented with volatile memory, non-volatile memory, or a combination thereof. Memory 220 may also be any physical device capable of non-transitory data storage, such as a computer program product that includes one or more non-transitory machine readable mediums encoding a plurality of instructions that when executed by one or more processors facilitate operation of an electronic device according to a process.

The receiver 208 may further include or otherwise be operatively coupled to a transceiver 224 that receives and transmits communication signals for exchanging information between the receiver 208 and other devices of the system. Transceiver 224, for example, may be located within or otherwise operatively coupled with the receiver 208 and configured to communicate with one or more other transceivers located inside and/or outside the area 10. In some embodiments, the transceiver is a RF signal antenna for transmitting data to and receiving data from a communications network. The communication signals may contain a variety of information, for example protocol information, images, fiducial pattern data, luminaire identifiers, system measurements, and/or fiducial pattern decoding instructions/commands that can be used to determine a vehicle position within the area.

Light-Based Fiducial Pattern Vehicle Positioning

As previously described, vehicle positioning systems that include magnetic and/or mechanical tracks are relatively restrictive and limit vehicle movements throughout the area. Moreover, systems that transmit information via RF signals are prone to errors caused by receiving inaccurate communication signals. The present disclosure addresses these problems by determining vehicle position using light-based communication signals. In an example embodiment, described in more detail below, the system uses light-based communication signals in the form of an asymmetric fiducial pattern to communicate luminaire position data, as well as an orientation of the luminaire relative to the area. As a result, the vehicle may move about the area with six-degrees of freedom (e.g., up/down side-to-side, forward/backward, pitch, roll and yaw). The system is further configured to process luminaire position data to determine a global vehicle position (e.g., an x-y coordinate position) relative to the area for purposes of guiding and/or tracking a vehicle throughout the area. In examples, a global position of the vehicle relative to the area can be determined using a single image of an asymmetric fiducial pattern.

System Architecture and Operation

Figure 3A:
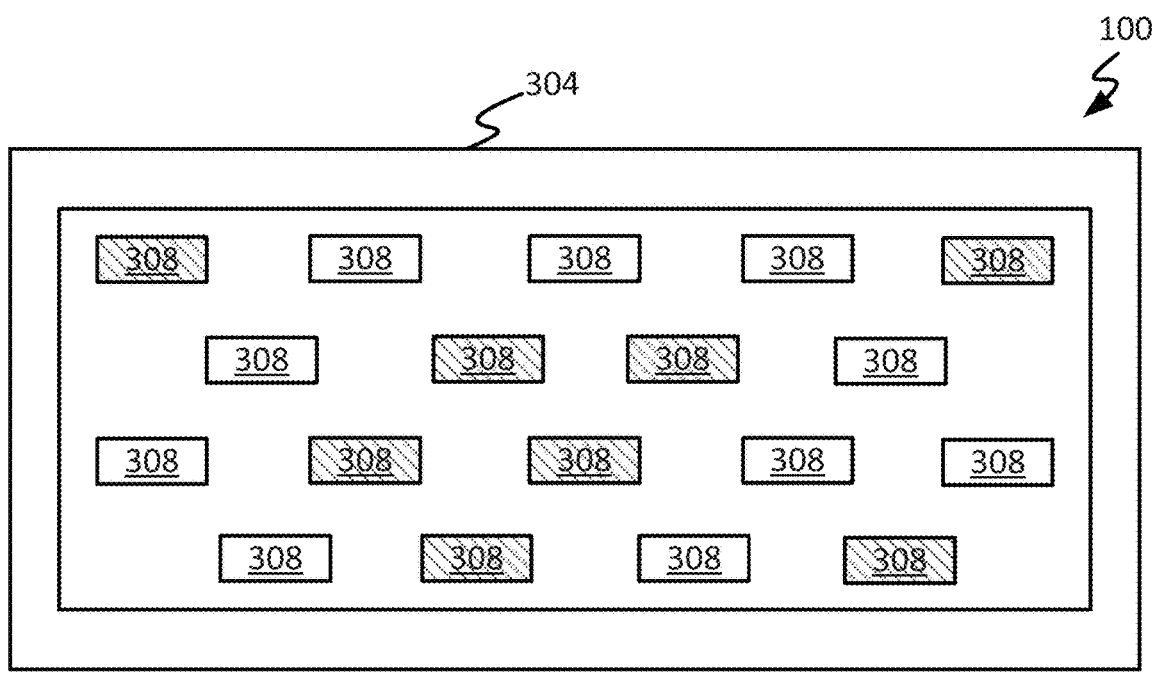
FIG. 3A is a bottom view of a luminaire configured in accordance with an embodiment of the present disclosure.

FIG. 3A illustrates a bottom view of a luminaire 100 configured in accordance with an embodiment of the present disclosure. Luminaire 100 is configured to transmit light to illuminate the area 10, and also luminaire position data, such as a luminaire identifier transmitted using a light-based fiducial pattern that can be used to determine a vehicle position within the area 10. As a result, luminaire position data can be communicated without environmental intrusions, such as those caused by signs and stickers, and without potential corruption from being damaged, torn or soiled (all of which are common in industrial environments).

Luminaire 100 is configured to house and operate a number of visible light sources 308 to transmit visible and infrared light. In an example embodiment, the luminaire 100 includes a housing 304 for containing one or more visible light sources 308. The housing 304, in some embodiments, has a form factor of a rectangle. In other embodiments, however, the housing 304 may take the form factor of a hexagon or diamond shape. In a more general sense note, the housing 304 may be any shape capable of maintaining visible light sources 308 in a fixed position.

Within the housing 304, are several visible light sources 308 configured to generate and transmit light, for example light emitting diodes (LEDs), in an asymmetric fiducial pattern that encoded with luminaire position data (e.g., a luminaire identifier). The data is converted from a piece of information into a light-based asymmetric fiducial pattern by illuminating light sources of a luminaire as described herein. Visible light sources 308, in some embodiments, are configured to operate with a short duty cycle (e.g., 100 milliseconds) or using low electrical current levels. In other embodiments, the light sources 308 are configured as dimmable light sources that display the asymmetric fiducial pattern at a number of different light intensity levels and thus, vary the illumination of the area.

The asymmetric shape of the fiducial pattern can be created based on physical arrangement of the light sources 308 within the luminaire 100. In some instances, low cost options, such as solder connections or conductive adhesives, can be used to mount individual light sources 308 in a pattern, such that a luminaire identifier is displayed when the light sources 308 are illuminated. In some embodiments, the fiducial pattern is reconfigurable, such that the fiducial pattern displayed by the light sources 308 is modified to communicate various types of information (e.g., commands, navigational information, weather reports, and emergency information). For instance, in some embodiments, the light sources 308 may be re-positioned at different locations within the housing 304 to create a different fiducial pattern.

Figure 3B:
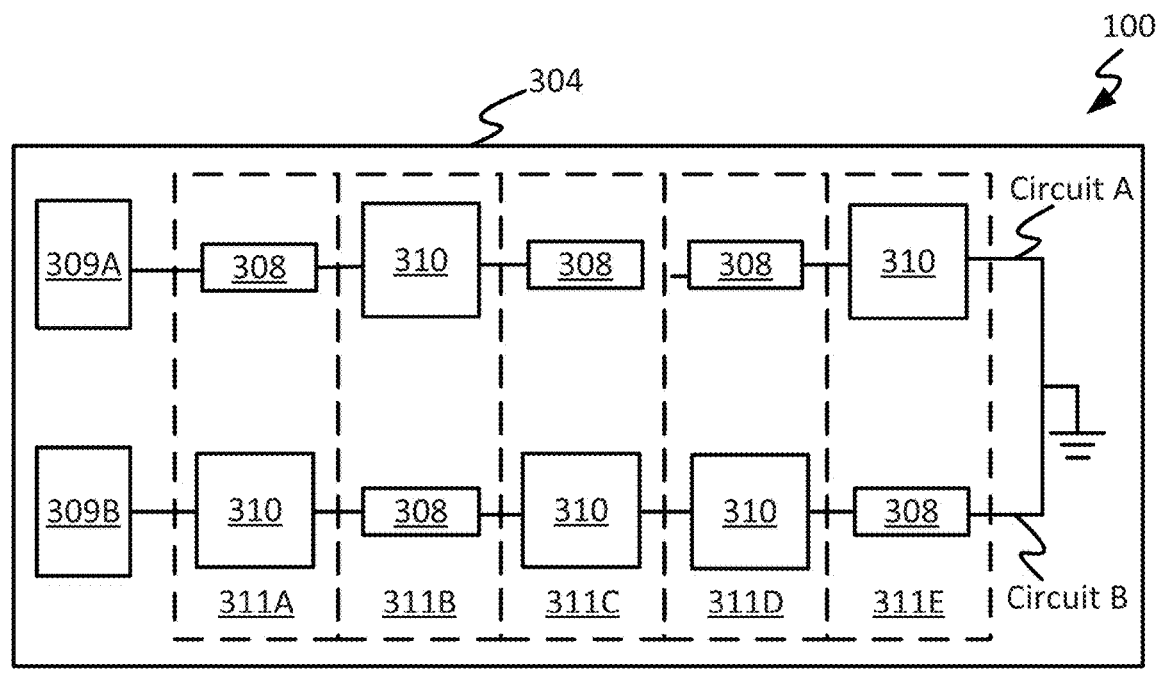
FIG. 3B is a schematic view of a luminaire configured in accordance with an embodiment of the present disclosure.

FIG. 3B is a schematic view of a luminaire 100 configured in accordance with an embodiment of the present disclosure. In addition to their location, visible light sources 308 can be operated in a fashion to create the asymmetric fiducial pattern whether or not the physical arrangement of the light sources 308 corresponds to the asymmetric pattern. In some embodiments, the luminaire 100 includes resistors, such as OR-resistors, that are operatively coupled to the light sources 308 to create the luminaire identifier. This is illustrated in FIG. 3B, in which the luminaire 100 includes power supplies 309A and 309B (collectively 309), each supply 309A and 309B is configured to provide electrical power to a combination of light sources 308 and resistors 310 via electric circuits, such as circuits "A" and "B". Circuits A and B are mounted parallel to one another within various sections 311A-E (collectively 311) of the luminaire 100, such that when a portion of circuit A has a light source 308 within a section, for example section 311A, then circuit B has a resistor located in that section. With power supplied to circuits A and B, each visible light source 308 creates a portion of the luminaire identifier, such that together light sources 308 of the circuits A and B represent the identifier. To improve accuracy, note that the circuits A and B are to be positioned as close as possible to one another within the luminaire 100.

In some embodiments, a switch is operatively connected to each power supply 309 to control the flow of electricity through circuits A and B and thus how the asymmetric fiducial pattern is displayed. In an example embodiment, a controller is coupled to the switches, such as a driver, configured to operate the switches and thus, control the operation of light sources 308. The switches, in other embodiments, are configured as a full-bridge, such that there are four switches to regulate the supply of power to light sources 308 in response to input from a controller. No matter their configuration, the switches control electrical power to circuits A and B and thus, how the fiducial pattern is displayed. In an example embodiment, electrical power may be alternately applied to each of the circuits A and B, such that the system can distinguish between the light sources 308 for circuit A and light sources 308 of circuit B to decode the asymmetric fiducial pattern. For instance, during a first half of a luminaire operational cycle, power is supplied to circuit A, such that the light sources connected to circuit A transmit light, while the light sources 308 connected to circuit B do not transmit light. In the second half of the cycle, the power is no longer supplied to circuit A, and thus light sources 308 of circuit A no longer transmit light. Circuit B, on the other hand, receives power and thus, the light sources 308 associated with circuit B transmit light. In such an instance, the system is configured to associate light sources 308 for circuit A with a first value, such as "1" in binary form. The system is also configured to associate light sources 308 of circuit B with a second value, for example "0" in binary form, different from the first value. In addition, in some embodiments, the visible light sources 308 can be positioned in different orientations, such as 180 degrees, from one another to create different bits of information (e.g., sources at 0 degrees are "1" and sources at 180 degrees are "0"). To distinguish between which circuit is transmitting during each half cycle of luminaire operation, a number of the visible light sources 308 are spatially positioned in relation to one another (e.g., positioned in a tight group) in a fashion to indicate the type of content (e.g., "1" or "0") for a given half cycle. With the content type for each half cycle determined, the system is configured analyze the received images to determine the encoded luminaire position data. In some embodiments, the sensor is synchronized with the timing of the visible light sources 308, such that multiple light signals within a single image can be identified from one another.

The asymmetric fiducial pattern, in other embodiments, is created by operation of the light sources 308, rather than light source position within the luminaire. In an example embodiment, the fiducial pattern is created by a combination of active (i.e., turned on) and inactive (i.e., turned off) visible light sources 308. In such an instance, the activated light sources are assigned a binary value of "1", while the deactivated light sources are assigned a binary value of "0". In other embodiments, the fiducial pattern is created using light color or a combination of light color and active visible light sources 308. Regardless of its configuration, the asymmetric light-based fiducial pattern communicates luminaire position data in a fashion that is less noticeable to persons within the area 10.

Fiducial patterns created using deactivated light sources, however, reduce the level of illumination provided by the luminaire 100 because only some of the visible light sources 308 are transmitting light while the fiducial pattern is displayed. To remedy this deficiency, in an example embodiment, the luminaire 100 is configured to create the fiducial pattern based on varying light intensity levels of lights sources 308. In example embodiment, the luminaire 100 is configured with two operational modes: (1) full luminescence mode and (2) message mode. When operating in full luminescence mode, the luminaire 100 is configured to output a maximum amount of light within the field of view (FOV) of the luminaire 100. A maximum amount of light may be defined in terms of physical component capability (e.g., maximum output of a LED) or programmatic limits imposed by system operating software. No matter how the maximum amount of light is defined, the full luminescence mode provides a sufficient amount of light to enable vehicles to navigate the area below and about the luminaire 100.

During message mode, however, the luminaire 100 outputs less light to create a fiducial pattern. In more detail, the fiducial pattern, in this example embodiment, is created by varying the light intensity levels for visible light sources 308. This can be seen in FIG. 3A, in which some of the visible light sources 308 are operating at higher light intensity (as indicated by the non-shaded boxes), while other visible light sources 308 are transmitting light at a lower light intensity level (as indicated by the shaded boxes). Creating a fiducial pattern with visible light sources 308 of varying light intensities allows the luminaire 100 to provide greater illumination to the area, while displaying a recognizable fiducial pattern, because all the visible light sources 308 are transmitting light. In addition, the fiducial pattern is reconfigurable by changing the light intensity level for visible light source 308 to create a different fiducial pattern. In example embodiment, the visible light sources 308 operating at higher intensity level (e.g., a maximum intensity level) can be assigned a value of "1" in binary form. The visible light sources 308 operating at a lower light intensity level can be assigned a value of "0" and thus, together lights sources 308 transmit luminaire position data in the form of a binary message (e.g., 0101110) that can decoded, as described herein, to determine a vehicle position relative to the luminaire 100. Lower light intensity levels can range from 50%, 65%, 70%, 85%, 90%, 93% and 95% of a higher light intensity level for a given luminaire 100. In a more general sense, the difference in the higher and lower light intensity levels should be as little as possible to provide a maximum amount illumination, but large enough so that the fiducial pattern is still recognizable. In addition, smaller differences between higher and lower light intensity levels create a fiducial pattern that is less noticeable to people within the area.

The amount of information transmitted by the fiducial pattern is dependent on the number of visible light sources 308. Each light source 308 transmits light that can be processed as a bit of information (e.g., "1" or "0"). Together, several visible light sources 308 form a fiducial pattern representing a message (e.g., 010011101) composed of several bits of information. Thus, the luminaire 100 is configured to generate a number of fiducial patterns equal to $2^n$, where n is the number of visible light sources 308, in binary form. In other embodiments, however, the luminaire 100 is configured not only to vary light intensity levels, but also light color. Color encoding schemes that vary light color can be used by the luminaire 100 to create numerous other fiducial patterns that are recognizable by vehicles within the area. Luminaire position data contained in such fiducial patterns and can be extracted by reading the pixel RGB values of the fiducial pattern image. Thus, luminaires 100 are configured to create fiducial patterns using light intensity and color can create a total number of fiducial patterns of 262,144.

Figure 3C:
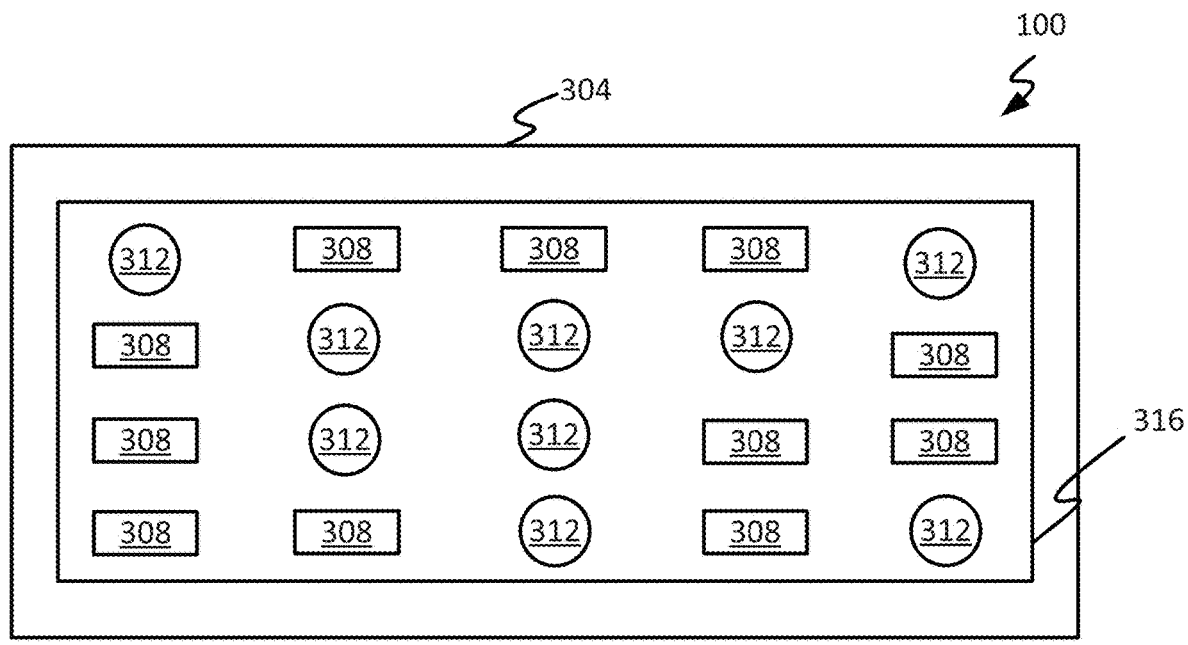
FIG. 3C is a bottom view of a luminaire including visible light sources and infrared light sources, in accordance with an embodiment of the present disclosure.

FIG. 3C is a bottom view of a luminaire 100 including visible light sources 308 and infrared light sources 312 in accordance with an embodiment of the present disclosure. Varying the light intensity levels of visible light sources 308 can be technically complex and may require software and/or hardware, such as drivers. Thus, the luminaire 100, in some embodiments, may include multiple infrared light sources 312 for displaying the fiducial pattern. In such embodiments, the fiducial pattern is displayed without limiting or adversely affecting the level of visible light transmitted by the luminaire 100 to illuminate the area. As can be seen in FIG. 3C, the infrared light sources 312, in an example embodiment, are mixed with the visible light sources 308, such that the infrared light sources 312 are arranged in an asymmetric pattern to communicate luminaire orientation and position data. Visible light sources 308, on the other hand, are arranged to illuminate the area 10. The visible lights sources 308, in some embodiments, are arranged in a symmetric pattern to provide a uniform level of illumination. In this example embodiment, the infrared light sources 312 and visible light sources 308 each have their own separate power electronic circuits, but this is not required. In other embodiments, a single electronic circuit may power both the visible light sources 308 and infrared light sources 312. In other instances, the luminaire 100 is configured with the infrared light sources 312 positioned along the perimeter of an opening 316 and within the housing 304, such that the infrared light sources 312 are separated from visible light sources 308.

Figure 3D:
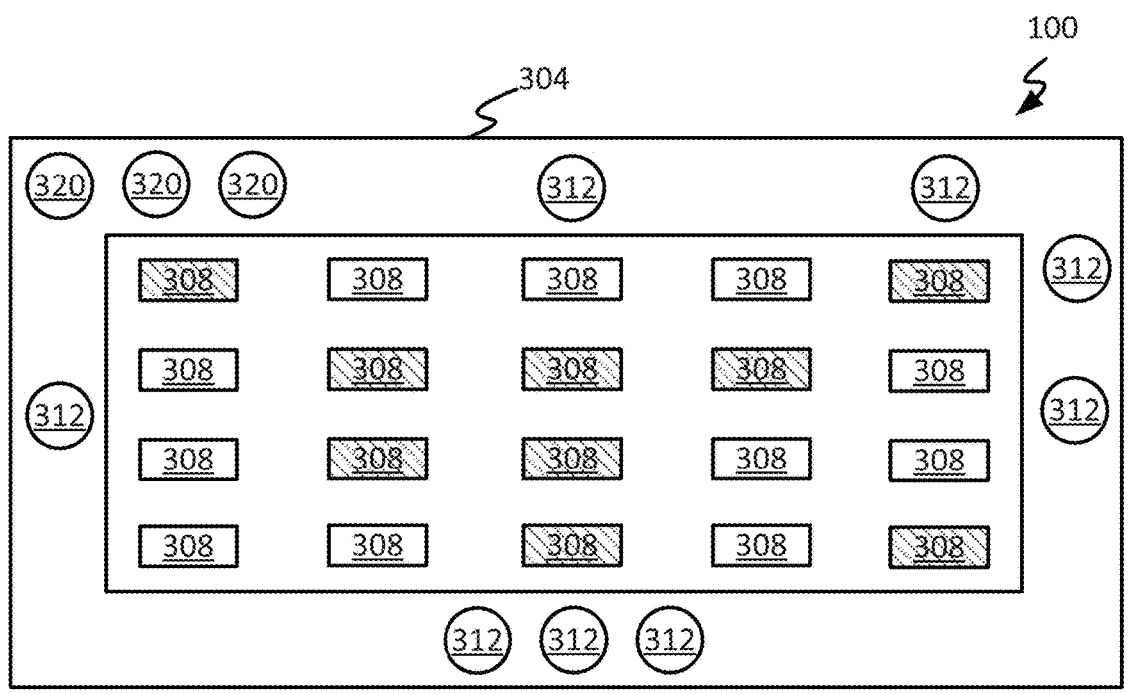
FIG. 3D is a bottom view of a luminaire with infrared light sources positioned along a perimeter of the luminaire, in accordance with an embodiment of the present disclosure.

FIG. 3D illustrates is a bottom view of a luminaire 100 with infrared light sources 312 and 320 positioned along a perimeter of the luminaire 100 in accordance with an embodiment of the present disclosure. In an example embodiment, the luminaire 100 includes visible light sources 308 configured to transmit light to illuminate the area and display a fiducial pattern to communicate non-positioning information (e.g., emergency information) to augment the positioning information transmitted by the infrared light sources 312 and 320. In more detail, the infrared light sources 312 and 320 are installed within the housing 304 to create unique asymmetrical patterns that can be decoded by the system (e.g., a vehicle) to determine vehicle position in the area. In an example embodiment, the infrared light sources 312 and 320 can be manufactured from pre-fabricated rolls of flexible material, for example tape. The luminaire position information is communicated based on the distances between the infrared light sources 312 and 320. The fiducial pattern includes both infrared light sources 312 and 320, but not in all cases. The fiducial pattern in other embodiments, however, can be created with simply the infrared light sources 312. Regardless of the light sources used, the fiducial pattern created by the infrared light sources 312 and 320 can be displayed in a continuous fashion whether or not the visible light sources 308 are activated.

In addition to luminaire position data, the luminaire 100 is further configured to communicate orientation information of the luminaire 100 relative to the area. Luminaire orientation information is any data and/or signals that can be used to determine a how a given luminaire 100 is positioned relative to the area. For instance, infrared light sources 320 are configured to transmit light signals that can be decoded to determine the orientation of the luminaire 100 relative to the area. In such instances, infrared light sources 320 when taken together form an origin that indicates a direction (e.g., north) of the luminaire 100 relative to the area. In other instances, the origin may include infrared light sources 320 positioned on two or more sides and/or on opposing sides of the luminaire 100. Regardless of their configuration, the system is configured to recognize the origin and associate a corresponding direction therewith, as described further herein.

Figure 3E:
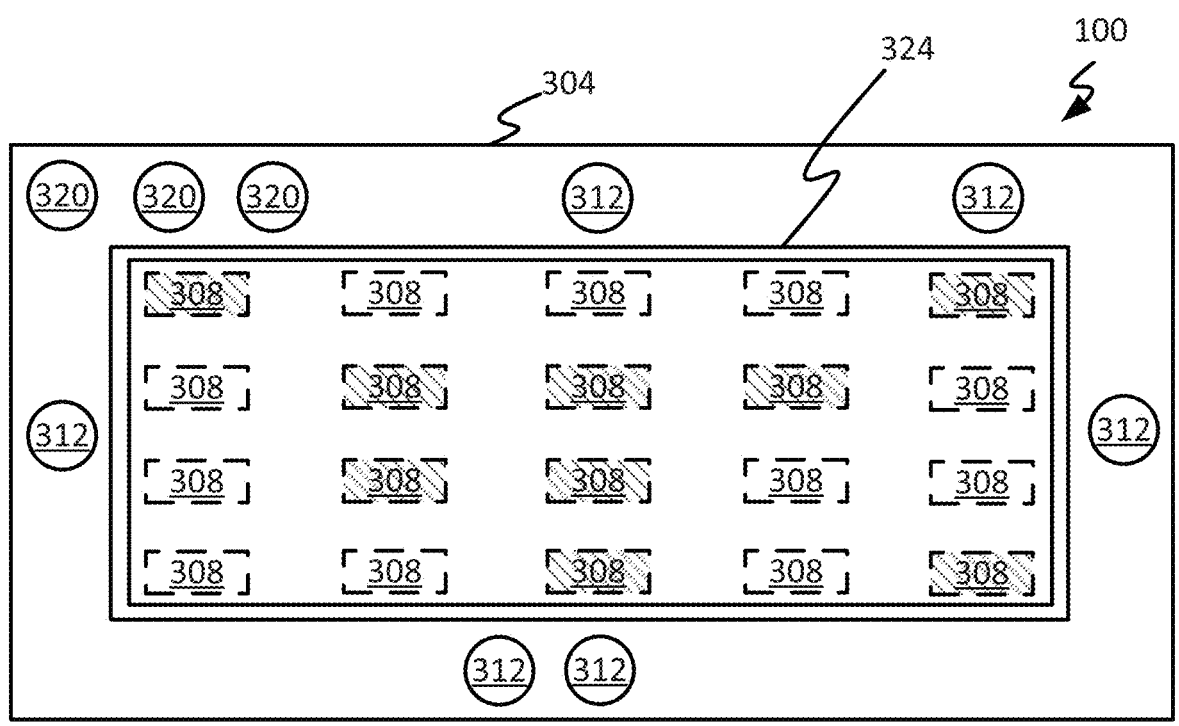
FIG. 3E is a bottom view of a luminaire with a diffuser positioned in front of visible light sources, in accordance with an embodiment of the present disclosure.

FIG. 3E is a bottom view of a luminaire 100 with a diffuser 324 positioned in front of visible light sources 308, in accordance with an embodiment of the present disclosure. The luminaire 100, in some embodiments, may also include or otherwise be coupled to other devices, such as diffuser 324, to improve the lighting experience. In an example embodiment, a diffuser 324 is attached or otherwise positioned between the visible light sources 308 (as indicated by the dash lines for the visible light sources 308) and the area. Placing the diffuser 324 in front of infrared light sources 312 and 320, however, may adversely affect the transmission of the infrared signal, if that signal is at frequency capable of being filtered by the diffuser 324. As a result, portions of the fiducial pattern may not be visible in the image and thus, causing the pattern to be incomplete and/or incorrect. To avoid inaccuracies caused by the diffuser 324, the infrared light sources 312 and 320 are positioned around the perimeter of the luminaire 100 and not covered by the diffuser 324, as shown in FIG. 3E. In other embodiments, the contour or shape of the diffuser 324 is configured to communicate information for determining luminaire position, for example communicating luminaire orientation based on an asymmetric shape. No matter its configuration, the diffuser 324 is configured to scatter the light to provide a soft light appearance within the area.

Figure 4:
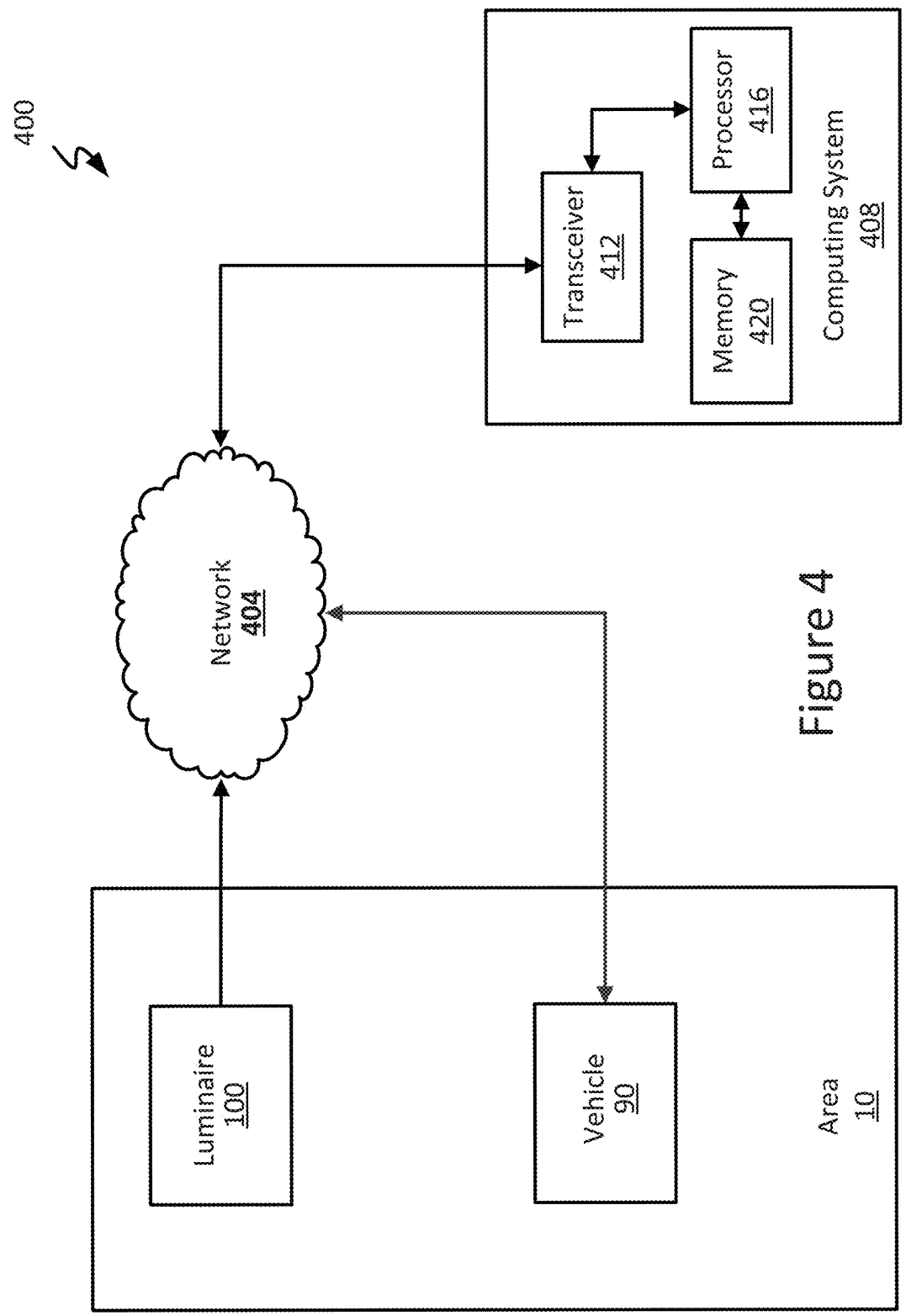
FIG. 4 is a block diagram of a system configured in accordance with an embodiment of the present disclosure.

FIG. 4 is a block diagram of a system 400 configured in accordance with an embodiment of the present disclosure. The system 400 includes an area 10, a network 404, and a computing system 408. The area 10 includes a luminaire 100 for transmitting luminaire position data to a vehicle 90, as previously described in relation to FIG. 1A.

As can be seen, the system 400 may allow for communicative coupling with a network 404 and one or more servers or computer systems 408. The network 404 may also place the luminaire 100 and/or the vehicle 90 in communication with the computing system 408 (as described herein). The network 404 may be a wireless local area network, a wired local network, or a combination of local wired and wireless networks, and may further include access to a wide area network such as the Internet or a campus-wide network. In a more general sense, network 404 can be any communications network.

The computing systems 408 may be any suitable computing system capable of communicating over a network 404, such as a cloud-based or local server computer, and may be programmed or otherwise configured to provide a vehicle positioning related service, according to some embodiments. For example, a vehicle positioning related service, might be, that the computing system 408 is configured to transmit a layout of luminaires within the area 10 to the vehicle 90 (e.g., a luminaire listing that cross-references identification numbers with locations within the area 10). Numerous other such configurations will be apparent in light of this disclosure.

The computing system 408 may further include or otherwise be operatively coupled to a transceiver 412 that receives and transmits communication signals to facilitate the exchange of information between the computing system 408 and other devices of the system 400. Transceiver 412, for example, may be located within or otherwise operatively coupled with the computing system 408 and configured to communicate with one or more other transceivers located inside and/or outside the area 10. In some embodiments, the transceiver 412 is a modem, or other suitable circuitry that allows for transmitting and receiving data from a network, such as network 404. Communication signals may include a variety of information, for example protocol information, images, fiducial pattern data, system measurements, and/or fiducial pattern instructions/commands.

Upon receiving data from the luminaires 100 and/or vehicles 90, the transceiver 412 may transmit the data to a processor 416, which in turn is programmed or otherwise configured to compile and distribute instructions and data. For example, in some embodiments, the processor 416 is configured to update a database of luminaire data in response to receiving an identification number for a new luminaire. The luminaire data, in some embodiments, can be transmitted to one or more vehicles 90 via the network 404 for determining vehicle position (as described below).

As can be seen, the computing system 408 further includes a memory 420 accessible by the processor 416. The data created and/or managed by the processor 416 may be stored within a memory 420 to support operations of the computing system 408. Memory 420 can be of any suitable type (e.g., RAM and/or ROM, or other suitable memory) and size, and in some cases may be implemented with volatile memory, non-volatile memory, or a combination thereof. Memory 420 may also be any physical device capable of non-transitory data storage, such as a computer program product that includes one or more non-transitory machine readable mediums encoding a plurality of instructions that when executed by one or more processors facilitate operation of an electronic device according to a process.

Figure 5:
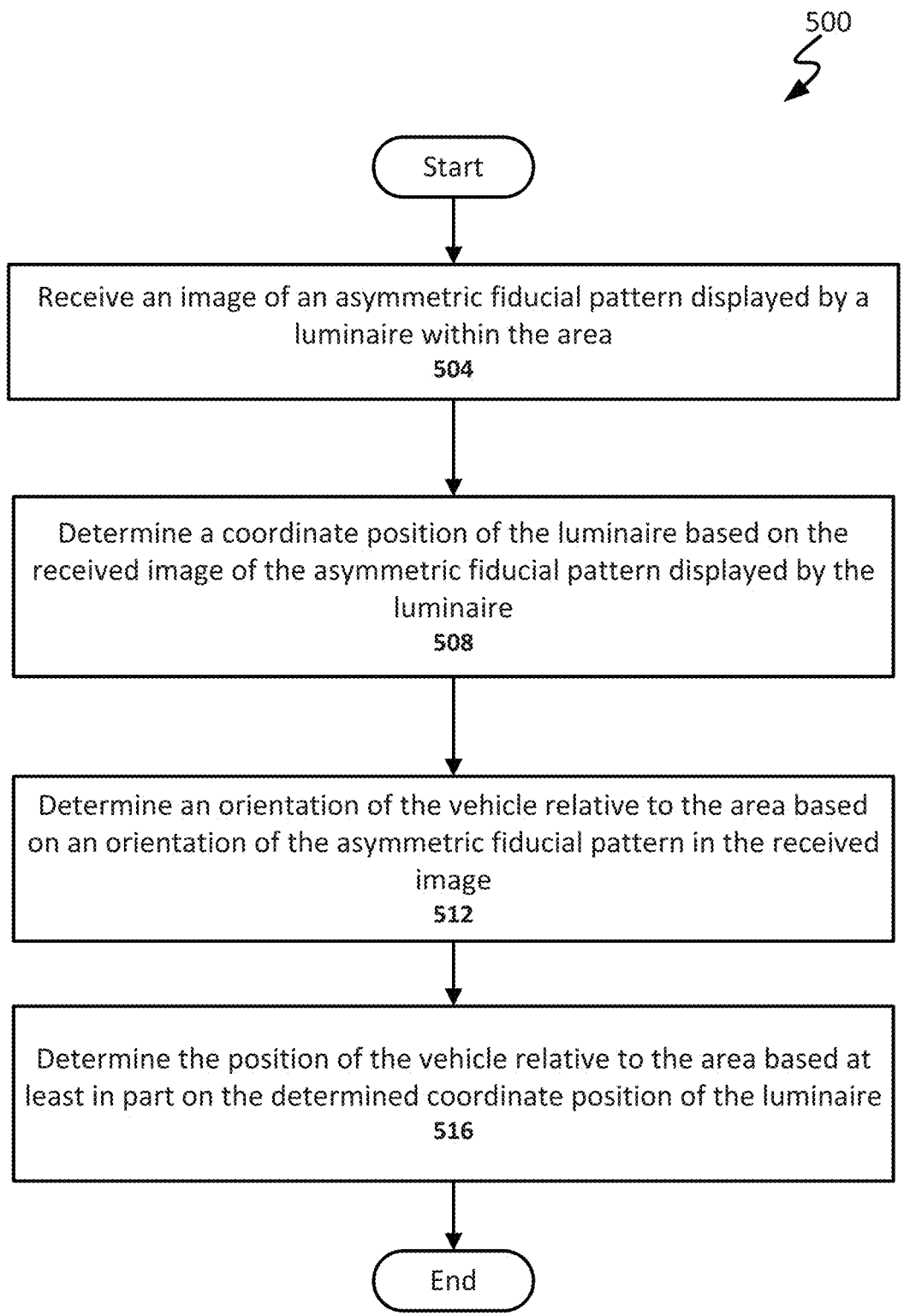
FIG. 5 is a flow chart of an example method for determining a position of a vehicle relative to an area, in accordance with an embodiment of the present disclosure.

Example Methods for Determining Vehicle Position with Light-Based Fiducial Patterns FIG. 5 is a flow chart of an example method 500 for determining position within an area, in accordance with an embodiment of the present disclosure. The method 500 includes receiving 504 an image of an asymmetric fiducial pattern displayed by a luminaire within the area. As previously described, the vehicle includes a sensor configured to process an image of a light-based asymmetric fiducial pattern displayed by a luminaire. As the luminaire enters the FOV of the sensor disposed on the vehicle, the sensor receives an image of the asymmetric fiducial pattern and transmits the image to a processor, operatively coupled thereto. The processor, in turn, is configured to analyze the asymmetric fiducial pattern to determine a relative position of the vehicle from the luminaire. Thus, the system is configured to determine a precise vehicle position within the area from a received image of an asymmetric fiducial pattern, as further described herein.

In some embodiments, precision and accuracy are improved by incorporating multiple sensors, such that each sensor is configured to receive or otherwise process an image of a given luminaire. Improvements are realized when vehicle position is determined using multiple images of the luminaire received by sensors having a different FOV of the luminaire (e.g., sensor #1 positioned at 45 degrees luminaire relative to the vehicle, sensor #2 positioned at 60 degrees relative to the vehicle, and so on). Data from the multiple images is combined or otherwise integrated using techniques, such as data fusion, to determine a more accurate vehicle position within the area. In some embodiments, implementing multiple sensors is impractical due to system constraints (e.g., the size of the vehicle or overall system cost). In such embodiments, system accuracy can be improved using a single high-resolution sensor. Numerous other embodiments for improving system accuracy will be apparent in light of this disclosure.

Accuracy and precision, in some other embodiments, is improved by adjusting one or more attributes of the sensor, rather than increasing the number and/or the type of sensors used in the system. Sensor attributes, such as shutter speed, can be adjusted to minimize adverse effects on the received image due to external factors, such as movement of the sensor and/or the level of ambient light present in the area. Shutter speed or exposure time is the length of time when a digital sensor is exposed to light. The amount of light that reaches the sensor is proportional to the exposure time. These factors can reduce image clarity and thus, reduce the accuracy of the determined vehicle position because the fiducial pattern appears distorted in the image. To reduce (or even eliminate) errors caused by external factors, adjustments, such as increasing or decreasing shutter speed to vary a sensor's exposure time, can improve image quality to produce a clear image of the fiducial pattern. In an example embodiment, a sensor is disposed on the vehicle that moves about the area. If the shutter speed of the sensor is slow, thus increasing exposure time, the image recorded by the sensor may be unclear (e.g., a blurred image). The image appears blurred because the vehicle moves away from the luminaire before the sensor has received or otherwise processed enough light to create an image. Increasing a sensor's shutter speed, however, enables the sensor to process a sufficient amount of light before the vehicle moves the sensor out view of the luminaire and thus, records a clear image. Shutter speeds, such as 30 to 500 micro seconds (μsec), are sufficient to capture a decoded image of the luminaire for a moving vehicle.

Figure 6A:
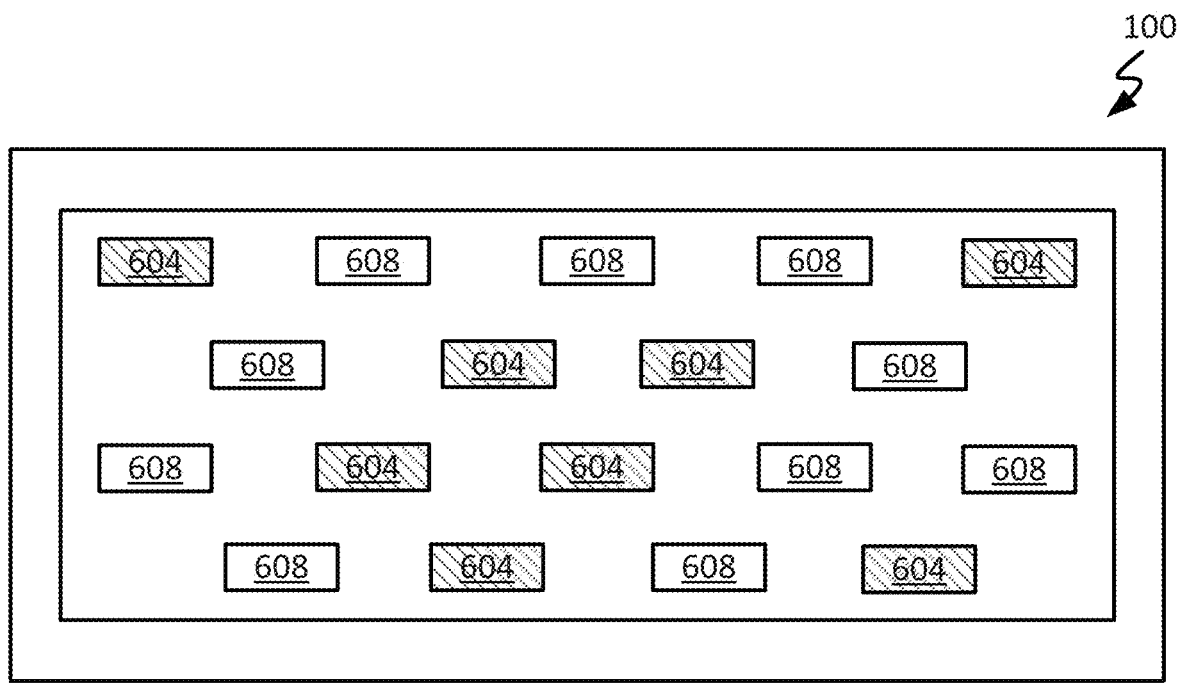
FIG. 6A is a bottom view of a luminaire configured in accordance with an embodiment of the present disclosure.
Figure 6B:
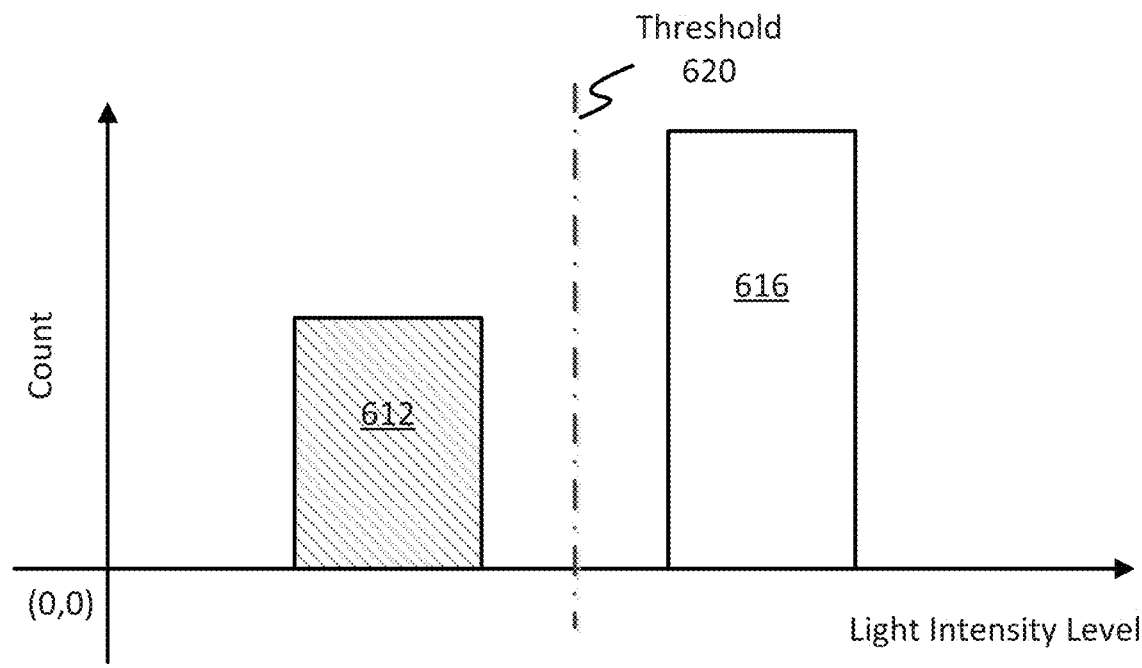
FIG. 6B is a graph for determining a threshold between high light intensity pixels and low light intensity pixels of an image for a light-based fiducial pattern, in accordance with an embodiment of the present disclosure.

The method 500 further includes determining 508 a coordinate position of the luminaire based on the received image of the asymmetric fiducial pattern displayed by the luminaire. Once displayed, the fiducial pattern can be decoded, for example by associating lower light intensity light sources with "0" and higher light intensity light sources with "1," to retrieve luminaire position data (e.g., a luminaire identifier) to determine a vehicle location within the area. In an example embodiment, the asymmetric light-based fiducial pattern is decoded using a fiducial pattern sequence, in which the first bit (e.g., the first light source) is located at the upper right-hand corner of the luminaire. The sequence then follows an order, for example from up-to-down and from right-to-left, to determine a luminaire identifier. A luminaire identifier is a number or symbol that is associated with a particular location within the area, for example a luminaire coordinate location. Along with the fiducial pattern sequence, the fiducial pattern can be decoded using algorithms, such as a histogram-thresholding algorithm. In more detail, a histogram-thresholding algorithm sorts the pixels of the received image based on light intensity level of the pixel to determine the fiducial pattern transmitted by the luminaire. This is illustrated by FIGS. 6A-B, in which, a luminaire 100 has several light sources 604 operating at a lower light intensity level (as indicated by the shaded boxes) than other light sources 608. In response to receiving the image, the system is configured to analyze the image to determine a threshold, which in turn can be used for assigning values, such "0" and "1" in binary form, to the bits of information (e.g., pixels corresponding to the light sources) shown in the image to obtain a message (e.g., 0101011 in binary form). Each pixel is analyzed to determine a brightness level. Note, in some embodiments, the sensor exposure time is very short (e.g., 50 μsec), such that the pixels of the image not corresponding to the light sources, such as ambient light sources, have a very low light intensity values and thus appear dark in the image. Pixels associated with the light sources, however, have higher light intensity values and appear bright in the image, and thus are easily distinguishable from pixels corresponding to ambient light sources. The pixels of the image are counted to determine a number of pixels for each light intensity level. This illustrated in FIG. 6B, in which the pixels corresponding light sources 604 and 608 are counted and identified by a brightness level. As can be seen, the count 612 corresponds to the pixels of the image associated with lower light intensity light sources 604 (as indicated by the shaded box). Count 616, on the other hand, corresponds to the pixels for the high light intensity level light sources 608 (as indicated by the unshaded box). As can be seen, count 616 is positioned further away from zero along the light intensity level axis than count 612. Based on the pixel counts 612 and 616, the system is configured to determine a threshold 620. The threshold 620, in an example embodiment, is a light intensity level value that is used to distinguish between pixels associated with lower brightness level light source (e.g., 604) and pixels of a higher brightness level light source (e.g., 608) for purposes of decoding the fiducial pattern. As can be seen, the threshold 620 is located at a light intensity value greater than count 612 but less than count 616. With the threshold 620 determined, the image can be analyzed using threshold 620 to assign pixels corresponding to light sources 604 to a lower light intensity level (e.g., "0") and pixels corresponding to light sources 608 to a higher light intensity level (e.g., "1"). In other embodiments, light color levels can be used to sort or otherwise distinguish the pixels of the received image from one another for purposes of decoding the fiducial pattern. Once assigned, the pixels corresponding to the lights sources 604 and 608 are analyzed to determine a fiducial pattern and extract the information encoded in pattern (e.g., the binary message).

With luminaire position data received and processed, the system is configured to determine a location of the luminaire in the received image. In an example embodiment, the luminaire position data is combined with luminaire layout information to determine a location of the luminaire shown in the image. Luminaire layout information may include, for example, maps, look-up tables, or database content that identity or otherwise indicate luminaire locations within the area. A map, in some embodiments, is a virtual representation of an area for determining a location of a vehicle based on a luminaire identifier, such as a number, symbol, or text. Other embodiments for determining a coordinate location of a luminaire within the area will be apparent in light of the present disclosure.

The method 500 further includes determining 512 an orientation of the vehicle relative to the area based on an orientation of the asymmetric fiducial pattern for the received image. As previously described, the luminaire is configured to display an asymmetric light-based fiducial pattern. The asymmetric shape of the fiducial pattern enables the system to communicate both luminaire orientation and location information via the pattern. Thus, the received image includes both luminaire orientation and location information in a single image. The system is configured to analyze the received image to determine a vehicle orientation relative to the area. In an example embodiment, the system is configured to locate light sources that indicate orientation relative to the area, for example infrared light sources 320 shown in FIG. 3C, within the image. The system, in some embodiments, can determine the location of such light sources based on the distance between light sources (e.g., light sources indicating orientation are positioned closer together than other light sources). The system is further configured to associate a particular direction (e.g., north) in relation to the area with the light sources that indicate orientation. The direction, in some embodiments, is a programmed input, such as light sources indicating orientation are in the north direction. With light sources indicating orientation determined and a direction associated therewith, the system is configured to analyze the recorded image to determine vehicle orientation in relation to the area. Vehicle orientation can further be used to convert a vehicle position relative to the luminaire to a vehicle position relative to the area, as described further herein. Other ways of determining vehicle orientation in relation to the area will be apparent in light of this disclosure.

The method 500 includes determining 516 a position of the vehicle relative to the luminaire based at least in part on the determined coordinate position of the luminaire. When the vehicle is located at a given luminaire (e.g., directly underneath it) the vehicle position and the luminaire position are the same. Thus, computing vehicle position is accomplished by determining the luminaire's position, as previously described. Vehicles moving about the area, however, are rarely positioned directly underneath luminaires. More often vehicles are located adjacent to a luminaire, and directly underneath it. The vehicles are thus located at a relative distance away from the luminaire. Although luminaire position can provide an approximate or estimated position of a vehicle in the area, for industrial environments, such as warehouses, highly accurate vehicle positions are needed to properly move goods, equipment and/or personnel throughout the area. To compute a precise position of the vehicle within the area, it is not enough to determine luminaire position. The system is further configured to determine a position of the vehicle relative to the luminaire.

In an example embodiment, the system is configured to determine a relative position of a vehicle from a luminaire using a model that describes a mathematical relationship between coordinates of a 3-D point representing the location of the luminaire and coordinates of a 2-D projected point on an image plane. Using this model, the system can translate the known 3-D coordinate position of the luminaire into a 3-D coordinate location of the sensor disposed on the vehicle based on a received image of the luminaire.

Figure 7:
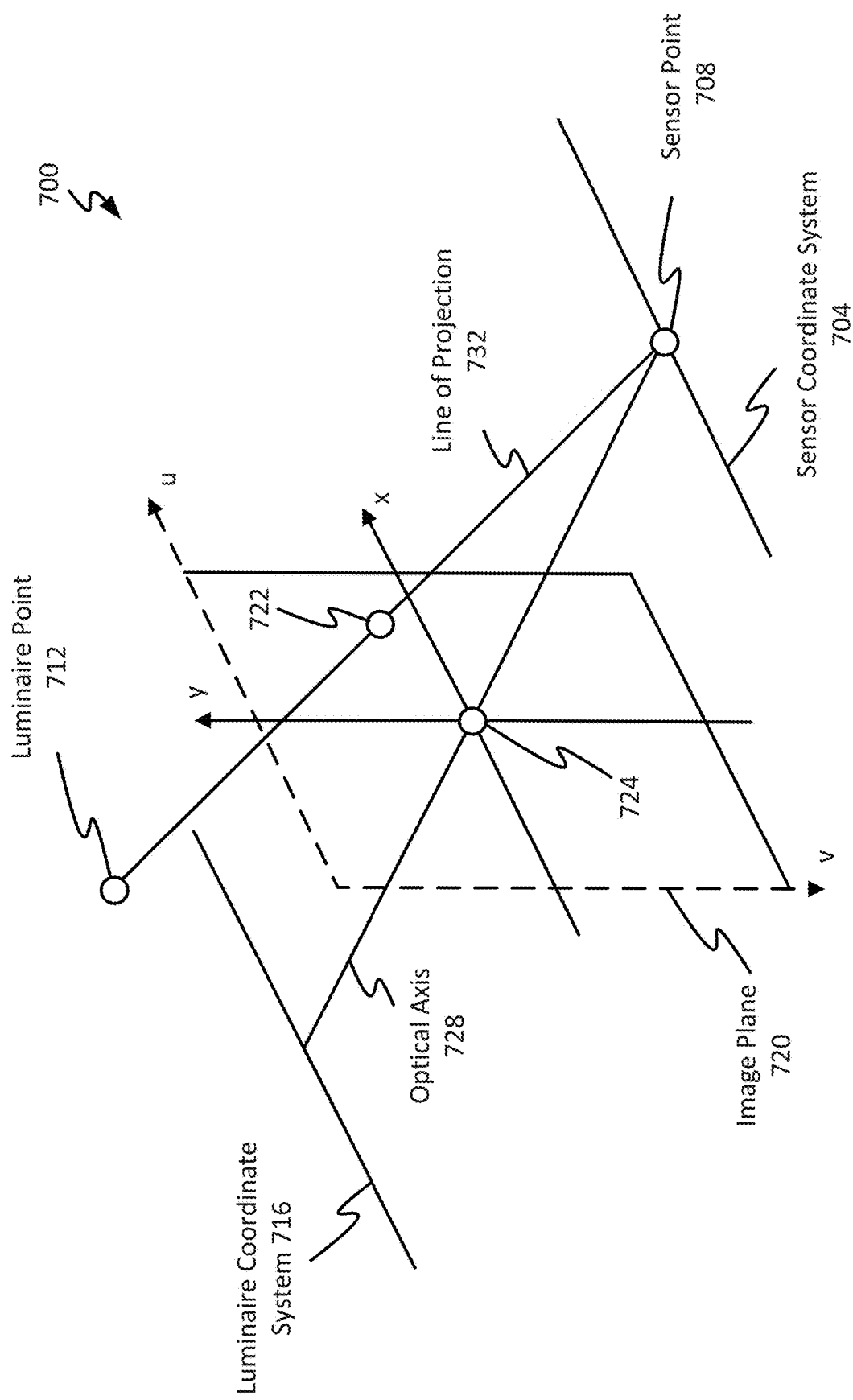
FIG. 7 is schematic view of a model for determining a relative position of a vehicle from a luminaire shown in a received image, in accordance with an embodiment of the present disclosure.

FIG. 7 is illustrates a model 700, such as a pin-hole camera model, for determining the relative position of a vehicle from a luminaire shown in the received image, in accordance with an example embodiment of the present disclosure. The model 700 includes a sensor coordinate system 704 that represents a reference axis from which a sensor point 708 is located. A sensor point 704 is a coordinate location (e.g., $(x_s, y_s, z_s)$) that represents the position of the sensor disposed on the vehicle at the time the image was received. Thus, the coordinate location for sensor point 708 is the relative position of the vehicle from the luminaire. For purposes of determining a 2-D coordinate position $(x_s, y_s)$ of the vehicle within the area along x and y coordinate planes as shown in FIG. 1B, the value of $z_s$ is not addressed as part of the analysis. Coordinate values $x_s$ and $y_s$ for sensor point 704 are determined based on a coordinate location (e.g., (x, y)) of the luminaire. The luminaire is represented by a luminaire point 712 located at a coordinate position $(x_1, y_1, z_1)$ in relation to a luminaire coordinate system 716. Luminaire point 712 represents the location of the luminaire within the area and thus, its coordinate location is known based on the received luminaire position data.

An image plane 720 is located between coordinate systems 704 and 716 and with a center 724 of the plane 720 intersecting an optical axis 728. The optical axis 728 represents the distance from the luminaire to the vehicle within the area (e.g., distance Z illustrated in FIG. 2A). The image plane 720 is configured to identify a 2-D coordinate location (e.g., (u, v)), represented as projected point 722, that can be translated into a coordinate location (e.g., (x, y) for sensor point 704. The projected point 722 is created using coordinate values of luminaire point 712 along with a line of projection 732. The mathematical modeling to transform a 3-D coordinate location of luminaire point 712 to a 2-D coordinate location (x, y) for sensor point 708 is summarized as follows:

$$sP_c = A[R\,|\,t]P \quad \text{or} \qquad \text{Equation (1)}$$

$$s\begin{bmatrix} u \\ v \\ 1 \end{bmatrix} = \begin{bmatrix} f_x & 0 & c_x \\ 0 & f_y & c_y \\ 0 & 0 & 1 \end{bmatrix}\begin{bmatrix} r_{11} & r_{12} & r_{13} \\ r_{21} & r_{22} & r_{23} \\ r_{31} & r_{32} & r_{33} \end{bmatrix}\begin{bmatrix} t_1 \\ t_2 \\ t_3 \end{bmatrix}\begin{bmatrix} X \\ Y \\ Z \\ 1 \end{bmatrix} \qquad \text{Equation (2)}$$

Vector $P_c$ represents coordinates of projected point 722 on the image plane 720 expressed in pixel units for the image plane coordinate system. Matrix A is the sensor matrix with intrinsic parameters. Center 724 is represented by $(c_x, c_y)$ in equation 2. Focal lengths $f_x$ and $f_y$ are expressed in pixel units, as well. Vector P represents coordinates of luminaire point 712 having known values for X, Y and Z, as previously described above. The matrix R|ε represents rotation and translation parameters, referred to as sensor extrinsic parameters, which describe the sensor motion around a static scene or motion of an object (e.g., a luminaire) in view of the sensor. Note, that the matrix R|t translates 3-D coordinate position (x, y, z) for luminaire point 712 to a 2-D coordinate position (e.g., (u, v)) within the image plane 720. The image plane 720 being a fixed distance with respect to sensor point 708. When distance of the optical axis 728 between sensor point 708 and luminaire point 712 is equal to zero, then the equation (2) above becomes:

$$u = f_x * x' + c_x \qquad \text{Equation (3)}$$

$$v = f_y * y' + c_y \qquad \text{Equation (4)}$$

where:

$$s = z \begin{cases} x' = x/z \\ y' = y/z \end{cases} \qquad \text{Equation (5)}$$

and $$\begin{bmatrix} x \\ y \\ z \end{bmatrix} = R\begin{bmatrix} X \\ Y \\ Z \end{bmatrix} + t \qquad \text{Equation (6)}$$

Using equation (6), the coordinate location of the sensor (x, y, z) can be determined as coordinate position of the luminaire point 712. Note, the above transformation does not address inaccuracies caused by decentering, thin prism, and/or radial distortions. Such distortions occur when there is a misalignment and/or defects in the lens for a sensor of the image capturing device. To account for these factors, the total effective distortion can be modeled as:

$$u = f_x * x'' + c_x \quad \text{Equation (7)}$$

$$v = f_y * y'' + c_y \quad \text{Equation (8)}$$

where:

$$x'' = x'\left[\frac{1+k_1r^2+k_2r^4+k_3r^6}{1+k_4r^2+k_5r^4+k_6r^6}\right] + 2p_1x'y' + p_2(r^2+2x'^2) + s_1r^2 + s_2r^4 \quad \text{Equation (9)}$$

$$y'' = y'\left[\frac{1+k_1r^2+k_2r^4+k_3r^6}{1+k_4r^2+k_5r^4+k_6r^6}\right] + 2p_1x'y' + p_2(r^2+2y'^2) + s_3r^2 + s_4r^4 \quad \text{Equation (10)}$$

$$r^2 = x'^2 + y'^2 \quad \text{Equation (11)}$$

$$s = z\begin{cases} x' = x/z \\ y' = y/z \end{cases} \quad \text{Equation (12)}$$

and $$\begin{bmatrix} x \\ y \\ z \end{bmatrix} = R\begin{bmatrix} X \\ Y \\ Z \end{bmatrix} + t \quad \text{Equation (13)}$$

Parameters k, p and s are coefficients for radial distortion, tangential distortion, and thin prism distortion, respectively. These coefficients, in some embodiments, can be estimated using sensor calibration procedures, such as 2-D calibration methods. In an example embodiment, 2-D calibration methods include calculating intrinsic parameters (e.g., matrix A) and distortion coefficients (e.g., k, p and s) from a series of images containing known 2-D patterns. These images can include 3-D to 2-D data, such that sensor parameters can be estimated. Once the sensor intrinsic parameters and distortion coefficients are determined, these values can be used to estimate matrices R and t, which in turn are used to determine the position of the sensor (e.g., the point 708 in FIG. 7) in relation to the image plane 720.

In some embodiments, where a group of luminaires are implemented to form the 2D pattern (e.g., the fiducial pattern), the sensor is configured with a very short exposure time, such that most of the regions of the image appear dark, such that the luminaires (or their individual light sources) present in the image are easily recognizable. As a result, less processing power is needed to analyze the captured 2-D image to determine the fiducial pattern because there are fewer pixels having an associated light intensity. Moreover, errors caused by motion blur are reduced because the short exposure time allows the sensor to capture the image prior to the vehicle moving out of view of the luminaire.

Further Considerations

Numerous other configurations will be apparent in light of this disclosure. For example, in some embodiments of the present disclosure, the luminaire includes sensors, such as accelerometer, to reduce and/or eliminate vehicle positioning errors. In some applications, the luminaires may move relative to the floor, despite being secured to a building's structure. Pendent luminaires, for example, pose a particular challenge, because these luminaires have a tendency to drift and/or vibrate due to external factors, such as the flow of air through the area. Luminaire movement can cause positioning errors because the received image illustrates the luminaire in a position other than its known coordinate position. As result, the model for determining relative position of the vehicle from the luminaire is inaccurate. To prevent such errors, luminaires can include sensors configured to measure stability and relative motion of the luminaire. In an example embodiment, sensors, such as accelerometers and gyroscopes, are configured to measure luminaire movement. These measurements can be transmitted via wired or wireless networks to a remote computing system and/or vehicle. Using these measurements, the system can update the luminaire location information and/or modify relative position calculations. The vehicle, in some embodiments, is configured to update and/or modify information without additional instructions and/or commands from the network. In other embodiments, however, the updating luminaire location information occurs at a central processor, such as a server or a remote computing system, while modifications to relative position calculations may be performed locally by the vehicles. Numerous other embodiments will be apparent in light of this disclosure.

Figure 8:
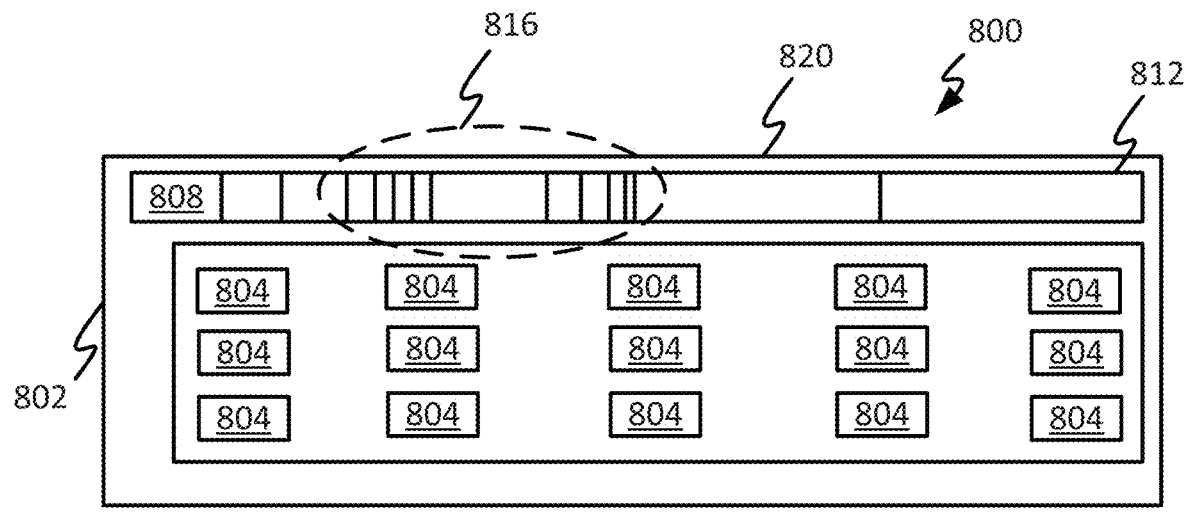
FIG. 8 is a bottom view of a luminaire that includes a light pipe for creating an asymmetric fiducial pattern, in accordance with an embodiment of the present disclosure.

FIG. 8 illustrates a bottom view of a luminaire that includes a light source for creating an asymmetric fiducial pattern of varying light intensity, in accordance with an example embodiment of the present disclosure. As can be seen in FIG. 8, the luminaire 800 includes a housing 802 with a plurality of visible light sources 804 and an infrared light source 808. Visible light sources 804, such as LEDs, are configured to transmit visible light for illuminating the area beneath and/or about the luminaire 800. The infrared light source 808 is configured to generate infrared light and is operatively coupled to a light pipe 812. The light pipe 812, in turn, is configured to display an asymmetric fiducial pattern using the received light from infrared light source 808. The displayed asymmetric fiducial pattern communicates luminaire position data to passing vehicles within the area.

In an example embodiment, the light pipe 812 is device, such as a tube or pipe, which is configured to receive light from the infrared light source 808 and transmit the received light along the length of pipe 812. Note, that the portion of the pipe 812 nearest the infrared light source 808 is illuminated at a higher light intensity level, than the portion of the pipe 812 located at the opposing end of the pipe 812 due to the propagation of the light through the pipe 812. In an example embodiment, the light pipe 812 is manufactured from a polymer material and engraved with a pattern 816. The engraving process, in some applications, is an automated process that provides a luminaire identifier in the form of a one dimension (1-D) pattern. More advanced manufacturing processes, however, can create pattern 816 in the form of a 2-D pattern. When illuminated, the pattern 816 displays an asymmetric fiducial pattern, similar to a barcode, which can be received by an image capturing device.

In some embodiments, the position of the light pipe 812 indicates an orientation of the luminaire relative to the area. In example embodiment, side 820 of the luminaire 800 directly adjacent to light pipe 820 is understood to be in a particular direction (e.g., north). In response, the system is configured to analyzed the recorded image and determine a vehicle orientation relative to the area based on the position of the light pipe 812 within as shown in the received image.

Figure 9:
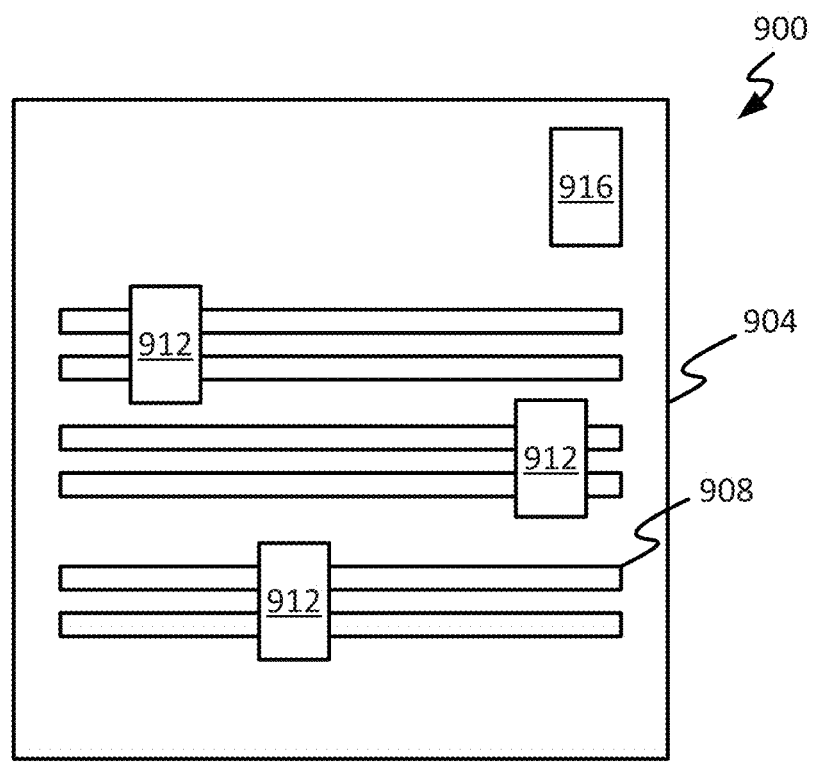
FIG. 9 is a bottom view of a luminaire configured in accordance with an embodiment of the present disclosure.

FIG. 9 illustrates a luminaire 900 configured in accordance with an example embodiment of the present disclosure. The luminaire 900 is configured to receive the light sources 912, for example infrared LEDs, in a number of configurations, such luminaire 900 is configured to display unique asymmetric fiducial patterns using light sources 912.

As can be seen in FIG. 9, the luminaire 900 includes a housing 904 that contains mounts 908, for example soldering pads, which are configured to receive the light sources 912. During luminaire manufacture, machines, for example pick-and-place machines, assemble each luminaire 900 with a different arrangement of light sources 912 and thus, embedding into each luminaire 900 its luminaire position data (e.g., a luminaire identifier) via an asymmetric pattern of light sources 912. Using computer vision techniques, the system is configured to decode luminaire position data from the arrangement of the light sources 912 within the luminaire 900. Note the number of available light source patterns is dependent on the particular configuration of the luminaire 900. Luminaire 900, for example, includes a three light source pattern. If each light source 912 is attached or otherwise secured to the mounts 908 in ten different locations along each mount 908, then the number of different fiducial patterns would be 1000 ($10^3$). In addition, note that the luminaire 900 includes a reference light source 916. The reference light source 916 enables the system to decode the fiducial pattern displayed by light sources 912, by providing a reference for determining an orientation of the luminaire 900.

In other embodiments of the present disclosure, the luminaire is configured to perform spatial dimension multiplexing visible light communication (SDMVLC). The luminaire, in an example embodiment, is configured with a plurality of light sources, for example infrared or visible light sources, that continuously transmit data frames (e.g., different fiducial patterns) in a temporal sequence. A temporal sequence is an order or series of different fiducial patterns that are collectively transmitted (e.g., display pattern 1, then pattern 2, next pattern 3 and then repeat). Each fiducial pattern contains at least one bit of data, as previously described. Multiple patterns, thus, can transmit a stream of information that can be decoded by the system. The time duration for a temporal sequence is to enable the image capturing device to record all displayed fiducial patterns from the luminaire, as defined by a data transmission protocol. The temporal sequence, thus, is transmitted at a particular frame rate. For instance, a temporal sequence, in some embodiments, is transmitted at a frame rate lower than a maximum frame rate for an image capturing device, such as a camera or sensor. If the frame rate for the temporal sequence is too low, however, the light sources may flicker and thus, adversely affecting the illumination and aesthetics of the surrounding area. A frame rate of 80 Hertz (Hz), for example, for the temporal sequence may be acceptable for image capturing devices having a frame rate of 240 frames-per-second. In such an example, the image capturing device records and/or otherwise processes three images of each fiducial pattern (i.e., the frame). Thus, synchronization of the luminaire and the image capturing device is not necessary, because the device captures at least one image of each displayed fiducial pattern, regardless, when device begins to recording.

Different fiducial patterns are created and displayed using light sources configured to individually and dynamically vary light intensity levels. Thus, each light source is a single channel or source of information/data. As a result, the amount of information transmitted by the luminaire is increased because the luminaire is transmitting information per individual light source rather than a group of light sources. Increasing the number fiducial patterns displayed by the luminaire allows the patterns to be displayed at lower frequencies while providing a high rate of data throughput. The complexity of the luminaire, as result, can be reduced since less sophisticated components can be implemented (e.g., no complex drivers to modulate light sources at high frequencies) to transmit fiducial patterns at low-frequencies.

The system, in some embodiments, is configured to generate a high resolution image to enable processing of fiducial patterns displayed at low light intensity levels. In an example embodiment, the light sources of the luminaire are operated at a high light intensity level, for example 100% light intensity level, to receive a high resolution image. In turn, the system is configured to analyze the high resolution image to locate pixels of individual luminaire light sources within the image. With the high resolution image received, the luminaire is configured to transmit a light-based fiducial pattern at lower light intensity levels. In response, the received image, in turn, is analyzed using the pixel locations identified from the high resolution image to determine the fiducial pattern. Thus, the system efficiency is improved, because the luminaire consumes less energy to create the asymmetric light-based fiducial pattern.

In other embodiments of the present disclosure, the luminaire is configured with an image capturing device, such as a camera or a dynamic vision sensor. The vehicle includes a light source disposed thereon and configured to display an asymmetric light-based fiducial pattern. Vehicle position is determined by a processor of the imaging capturing device using methods and techniques described herein. Once determined, the vehicle position within the area is transmitted to the vehicle via a network, such as BLUETOOTH®, ZIGBEE® and Wi-Fi network. Processing vehicle and luminaire position data in this fashion reduces the computational complexity for the vehicles of the system.

VLC Mobile Transport Vehicle Positioning

In addition to using light-based communication signals in the form asymmetric fiducial patterns, some embodiments of the present disclosure use VLC signals to determine vehicle position within the area. A luminaire can generate VLC signals by modulating one or more light sources disposed therein. To accurately determine vehicle position using VLC signals, the luminaires are located at a constant distance from the sensors disposed on the vehicles. In addition, the sensors can be disposed on the vehicle such that the sensor does not tilt (e.g., move in a pitch, yaw or roll direction) relative to the vehicle during vehicle movements to improve system accuracy. The known distance enables the system associate to a pair of angles with each pixel location of an image received by the sensor. The angles are used to determine a vehicle position relative to a luminaire depicted in the image, as described in further detail herein. In addition, to determine vehicle orientation relative to the area, the system is configured to process multiple images of luminaires within the area to determine multiple luminaire locations and relative vehicle distances therefrom.

System Architecture and Operation

Figure 10:
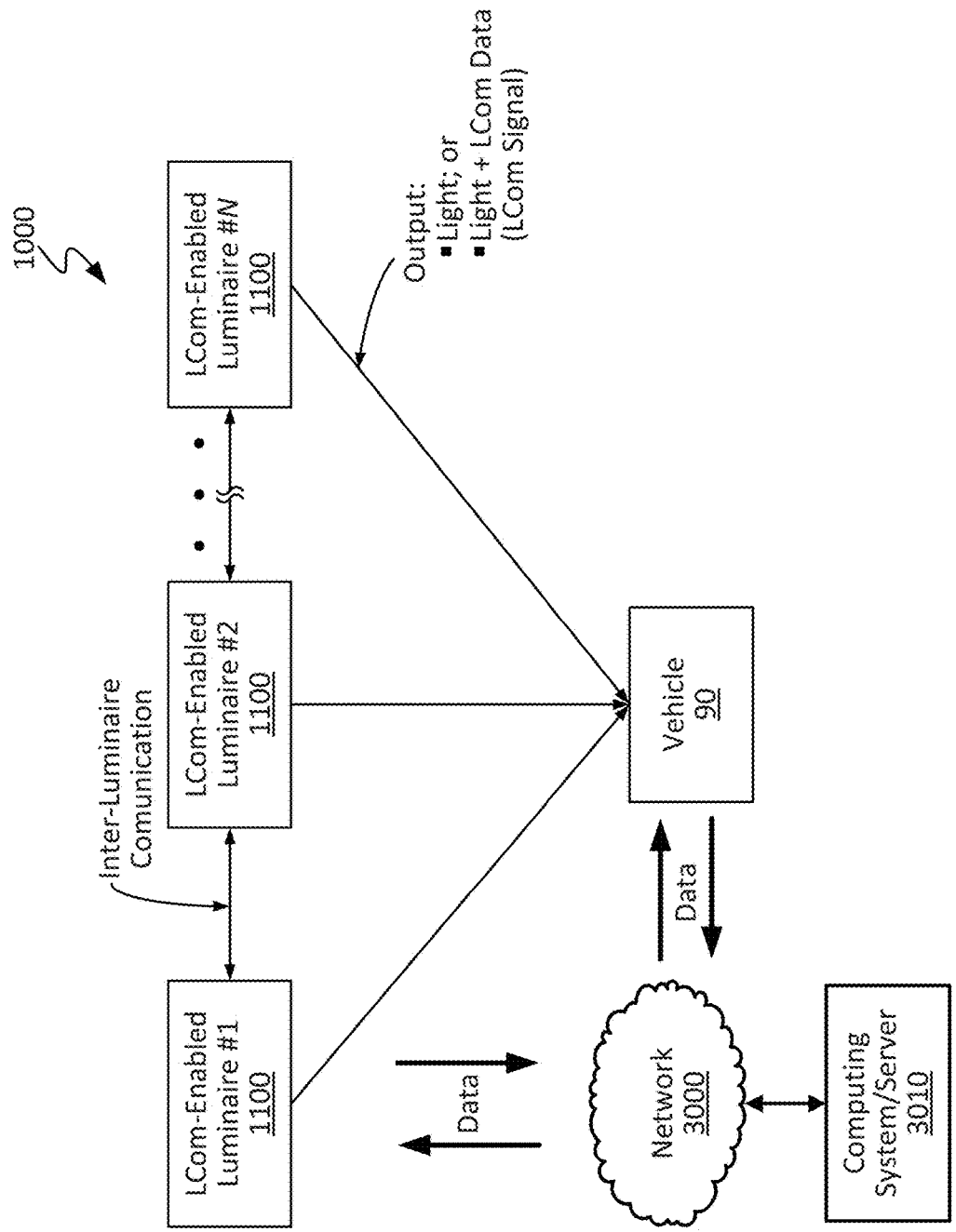
FIG. 10 is a block diagram illustrating an example light-based communication (LCom) system configured in accordance with an embodiment of the present disclosure.

FIG. 10 is a block diagram illustrating an example light-based communication (LCom) system 1000 configured in accordance with an embodiment of the present disclosure. As can be seen, system 1000 may include one or more LCom-enabled luminaires 1100 configured for light-based communicative coupling with a receiver of a vehicle 90 via LCom signal(s). As discussed herein, such LCom may be provided, in accordance with some embodiments, via visible light-based signals. In some cases, LCom may be provided in only one direction; for instance, LCom data may be passed from a given LCom-enabled luminaire 1100 (e.g., the transmitter) to a vehicle 90 (e.g., the receiver), or from a vehicle 90 (e.g., the transmitter) to a given LCom-enabled luminaire 1100 (e.g., the receiver). In some other cases, LCom may be provided in a bi-directional fashion between a given LCom-enabled luminaire 1100 and a vehicle 90, where both act as a transceiver device capable of transmitting and receiving.

In some cases in which system 1000 includes a plurality of LCom-enabled luminaires 1100, all (or some sub-set thereof) may be configured for communicative coupling with one another so as to provide inter-luminaire communication. In one such scenario, for instance, the inter-luminaire communication can be used to notify other luminaries 1100 that a given vehicle 90 is currently present, as well as the position information for that particular vehicle 90. Such inter-luminaire communication is not needed, however, as will be appreciated in light of this disclosure.

As can be further seen in this example embodiment, system 1000 allows for communicative coupling with a network 3000 and one or more servers or other computer systems 3010. Communicative coupling may be provided, for example, between network 3000 and vehicles 90 and/or one or more LCom-enabled luminaires 1100, as desired. The network 3000 may be a wireless local area network, a wired local network, or a combination of local wired and wireless networks, and may further include access to a wide area network such as the Internet or a campus-wide network. In short, network 3000 can be any communications network.

The computer systems 3010 may be any suitable computing system capable of communicating over a network 3000, such as a cloud-based server computer, and may be programmed or otherwise configured to provide an LCom related service, according to some embodiments. For example, an LCom related service might be that the computer system 3010 is configured to provide storage of luminaire position data. Numerous other such configurations will be apparent in light of this disclosure.

Figure 11A:
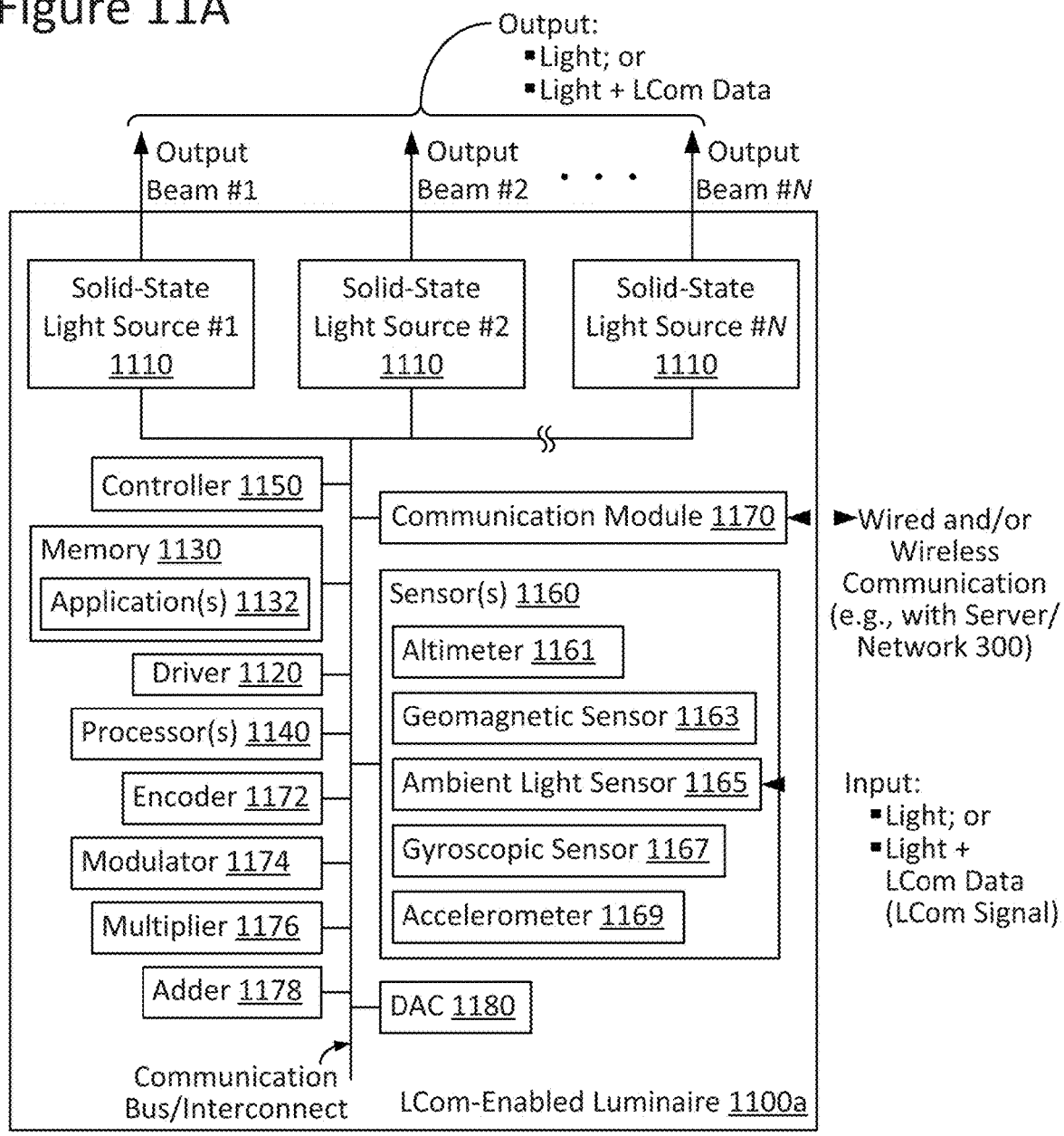
FIG. 11A is a block diagram illustrating an LCom-enabled luminaire configured in accordance with an embodiment of the present disclosure.
Figure 11B:
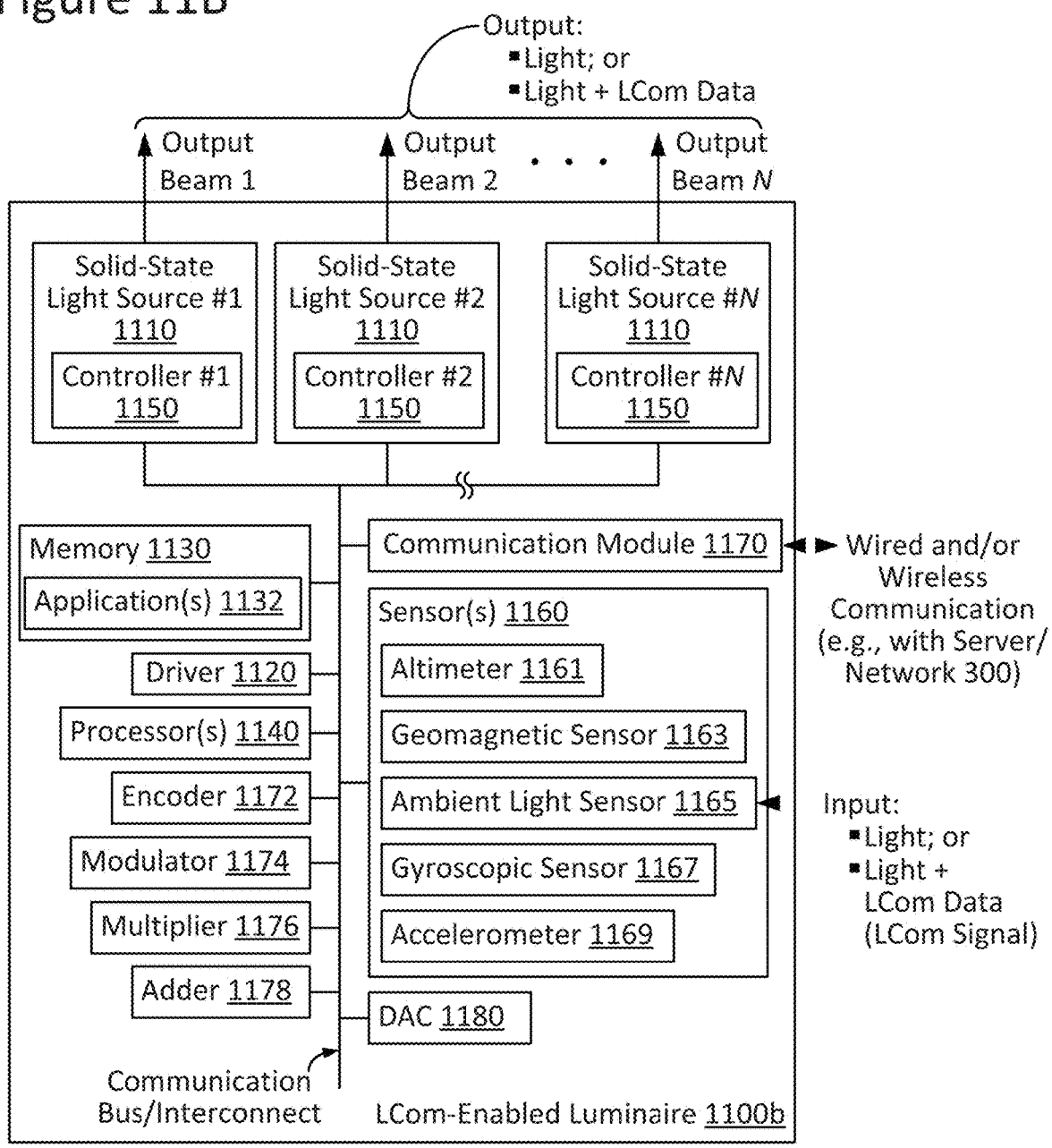
FIG. 11B is a block diagram illustrating an LCom-enabled luminaire configured in accordance with another embodiment of the present disclosure.

FIG. 11A is a block diagram illustrating an LCom-enabled luminaire 1100a configured in accordance with an embodiment of the present disclosure. FIG. 11B is a block diagram illustrating an LCom-enabled luminaire 1100b configured in accordance with another embodiment of the present disclosure. As can be seen, a difference between luminaire 1100a and luminaire 1100b is with respect to the location of controller 1150. For consistency and ease of understanding of the present disclosure, LCom-enabled luminaires 1100a and 1100b hereinafter may be collectively referred to generally as an LCom-enabled luminaire 1100, except where separately referenced. Further note that while various modules are shown as distinct modules for purposes of illustration, any number of the modules may be integrated with one or more other modules. For instance, the controller 1150 may be integrated with the driver 1120. Similarly, the processor(s) 1140 and memory 1130 may be integrated within the controller 1150. Numerous other configurations can be used.

As can be seen, a given LCom-enabled luminaire 1100 may include one or more solid-state light sources 1110, in accordance with some embodiments. The quantity, density, and arrangement of solid-state light sources 1110 utilized in a given LCom-enabled luminaire 1100 may be customized, as desired for a given target application or end-use. A given solid-state light source 1110 may include one or more solid-state emitters, which may be any of a wide range of semiconductor light source devices, such as, for example, a light-emitting diode (LED), an organic light-emitting diode (OLED), a polymer light-emitting diode (PLED), or a combination of any of these. A given solid-state emitter may be configured to emit electromagnetic radiation, for example, from the visible spectral band and/or other portions of the electromagnetic spectrum not limited to the infrared (IR) spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In other embodiments, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate. In some cases, power and/or control connections for a given solid-state emitter may be routed from a given PCB to a driver 1120 (discussed in turn below) and/or other devices/componentry, as desired. Other suitable configurations for the one or more solid-state emitters of a given solid-state light source 1110 will depend on a given application and will be apparent in light of this disclosure.

A given solid-state light source 1110 also may include one or more optics optically coupled with its one or more solid-state emitters. In accordance with some embodiments, the optic(s) of a given solid-state light source 1110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 1110 may be formed from a single (e.g., monolithic) piece of optical material to provide a single, continuous optical structure. In some other cases, the optic(s) of a given solid-state light source 1110 may be formed from multiple pieces of optical material to provide a multi-piece optical structure. In some cases, the optic(s) of a given solid-state light source 1110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 1110 may be configured, for example, to focus and/or collimate light transmitted there through. Other suitable types, optical transmission characteristics, and configurations for the optic(s) of a given solid-state light source 1110 will depend on a given application and will be apparent in light of this disclosure.

In accordance with some embodiments, the one or more solid-state light sources 1110 of a given LCom-enabled luminaire 1100 may be electronically coupled with a driver 1120. In some cases, driver 1120 may be an electronic driver (e.g., single-channel; multi-channel) configured, for example, for use in controlling one or more solid-state emitters of a given solid-state light source 1110. For instance, in some embodiments, driver 1120 may be configured to control the on/off state, dimming level, color of emissions, correlated color temperature (CCT), and/or color saturation of a given solid-state emitter (or grouping of emitters). To such ends, driver 1120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 1120 to adjust AC voltage to driver 1120); and/or (8) a combination of any one or more thereof. Other suitable configurations for driver 1120 and lighting control/driving techniques will depend on a given application and will be apparent in light of this disclosure.

As will be appreciated in light of this disclosure, a given solid-state light source 1110 also may include or otherwise be operatively coupled with other circuitry/componentry, for example, which may be used in solid-state lighting. For instance, a given solid-state light source 1110 (and/or host LCom-enabled luminaire 1100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 1110); (2) constant current/voltage driver componentry; (3) transmitter and/or receiver (e.g., transceiver) componentry; and/or (4) local processing componentry. When included, such componentry may be mounted, for example, on one or more driver 1120 boards, in accordance with some embodiments.

As can be further seen from FIGS. 11A-11B, a given LCom-enabled luminaire 1100 may include memory 1130 and one or more processors 1140. Memory 1130 can be of any suitable type (e.g., RAM and/or ROM, or other suitable memory) and size, and in some cases may be implemented with volatile memory, non-volatile memory, or a combination thereof. A given processor 1140 may be configured as typically done, and in some embodiments may be configured, for example, to perform operations associated with a given host LCom-enabled luminaire 1100 and one or more of the applications 1132 thereof (e.g., within memory 1130 or elsewhere). In some cases, memory 1130 may be configured to be utilized, for example, for processor workspace (e.g., for one or more processors 1140) and/or to store media, programs, applications, and/or content on a host LCom-enabled luminaire 1100 on a temporary or permanent basis. In one example embodiment, the memory 1130 stores its position (whether programmed manually or received using an embodiment of the present disclosure) that indicates where the luminaire is deployed (for purposes of facilitating navigation, as previously explained), and may further include a look-up table (LUT) or other memory facility that indexes luminaire locations within the area.

The one or more applications 132 stored in memory 1130 can be accessed and executed, for example, by the one or more processors 1140 of a given LCom-enabled luminaire 1100. In accordance with some embodiments, a given application 1132 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications 1132 can be instructions encoded on any suitable non-transitory machine-readable medium that, when executed by one or more processors 1140, carries out functionality of a given LCom-enabled luminaire 1100, in part or in whole. In any case, the luminaire can broadcast a luminaire position using VLC signals to passing vehicles 90.

In accordance with some embodiments, the one or more solid-state light sources 1110 of a given LCom-enabled luminaire 1100 can be electronically controlled, for example, to output light and/or light encoded with LCom data (e.g., an LCom signal). To that end, a given LCom-enabled luminaire 1100 may include or otherwise be communicatively coupled with one or more controllers 1150. In some such example embodiments, such as that illustrated in FIG. 11A, a controller 1150 may be hosted by a given LCom-enabled luminaire 1100 and operatively coupled (e.g., via a communication bus/interconnect) with the one or more solid-state light sources 1110 (1-N) of that LCom-enabled luminaire 1100. In this example case, controller 1150 may output a digital control signal to any one or more of the solid-state light sources 1110 and may do so, for example, based on wired and/or wireless input received from a given local source (e.g., such as on-board memory 1130) and/or remote source (e.g., such as a control interface or network 3000). As a result, a given LCom-enabled luminaire 1100 may be controlled in such a manner as to output any number of output beams (1-N), which may include light and/or LCom data (e.g., an LCom signal), as desired for a given target application or end-use. However, the present disclosure is not so limited.

For example, in some other embodiments, such as that illustrated in FIG. 11B, a controller 1150 may be packaged or otherwise hosted, in part or in whole, by a given solid-state light source 1110 of a given LCom-enabled luminaire 1100 and operatively coupled (e.g., via a communication bus/interconnect) with the one or more solid-state light sources 1110. If LCom-enabled luminaire 1100 includes a plurality of such solid-state light sources 1110 hosting their own controllers 1150, then each such controller 1150 may be considered, in a sense, a mini-controller, providing LCom-enabled luminaire 1100 with a distributed controller 1150. In some embodiments, controller 1150 may be populated, for example, on one or more PCBs of the host solid-state light source 1110. In this example case, controller 1150 may output a digital control signal to an associated solid-state light source 1110 of LCom-enabled luminaire 1100 and may do so, for example, based on wired and/or wireless input received from a given local source (e.g., such as on-board memory 1130) and/or remote source (e.g., such as a control interface, network 3000, etc.). As a result, LCom-enabled luminaire 1100 may be controlled in such a manner as to output any number of output beams (1-N), which may include light and/or LCom data (e.g., an LCom signal), as desired for a given target application or end-use.

In accordance with some embodiments, a given controller 1150 may host one or more lighting control modules and can be programmed or otherwise configured to output one or more control signals, for example, to adjust the operation of the solid-state emitter(s) of a given solid-state light source 1110 according to communicate luminaire position. For example, in some cases, a given controller 1150 may be configured to output a control signal to control whether the light beam of a given solid-state emitter is on/off. In some instances, a given controller 1150 may be configured to output a control signal to control the intensity/brightness (e.g., dimming; brightening) of the light emitted by a given solid-state emitter. In some cases, a given controller 1150 may be configured to output a control signal to control the color (e.g., mixing; tuning) of the light emitted by a given solid-state emitter. Thus, if a given solid-state light source 1110 includes two or more solid-state emitters configured to emit light having different wavelengths, the control signal may be used to adjust the relative brightness of the different solid-state emitters in order to change the mixed color output by that solid-state light source 1110. In some embodiments, controller 1150 may be configured to output a control signal to encoder 1172 (discussed below) to facilitate encoding of LCom data for transmission by a given LCom-enabled luminaire 1100. In some embodiments, controller 1150 may be configured to output a control signal to modulator 1174 (discussed below) to facilitate modulation of an LCom signal for transmission by a given LCom-enabled luminaire 1100. Other suitable configurations and control signal output for a given controller 1150 of a given LCom-enabled luminaire 1100 will depend on a given application and will be apparent in light of this disclosure.

In accordance with some embodiments, a given LCom-enabled luminaire 1100 may include an encoder 1172. In some embodiments, encoder 1172 may be configured, for example, to encode LCom data in preparation for transmission thereof by the host LCom-enabled luminaire 1100. To that end, encoder 1172 may be provided with any suitable configuration, as will be apparent in light of this disclosure.

In accordance with some embodiments, a given LCom-enabled luminaire 1100 may include a modulator 1174. In some embodiments, modulator 1174 may be configured, for example, to modulate an LCom signal in preparation for transmission thereof by the host LCom-enabled luminaire 1100. In some embodiments, modulator 1174 may be a single-channel or multi-channel electronic driver (e.g., driver 1120) configured, for example, for use in controlling the output of the one or more solid-state emitters of a given solid-state light source 1110. In some embodiments, modulator 1174 may be configured to control the on/off state, dimming level, color of emissions, correlated color temperature (CCT), and/or color saturation of a given solid-state emitter (or grouping of emitters). To such ends, modulator 1174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 1174 to adjust AC voltage to modulator 1174); and/or (8) any other suitable lighting control/driving technique, as will be apparent in light of this disclosure. Other suitable configurations and control/ driving techniques for modulator 1174 will depend on a given application and will be apparent in light of this disclosure.

In accordance with some embodiments, a given LCom-enabled luminaire 1100 may include a multiplier 1176. Multiplier 1176 may be configured as typically done, and in some example embodiments may be configured to combine an input received from an upstream modulator 1174 with an input received from an ambient light sensor 1165 (discussed below). In some instances, multiplier 1176 may be configured to increase and/or decrease the amplitude of a signal passing there through, as desired. Other suitable configurations for multiplier 1176 will depend on a given application and will be apparent in light of this disclosure. In accordance with some embodiments, a given LCom-enabled luminaire 1100 may include an adder 1178. Adder 1178 may be configured as typically done, and in some example embodiments may be configured to combine an input received from an upstream multiplier 1176 with a DC level input. In some instances, adder 1178 may be configured to increase and/or decrease the amplitude of a signal passing there through, as desired. Other suitable configurations for adder 1178 will depend on a given application and will be apparent in light of this disclosure.

In accordance with some embodiments, a given LCom-enabled luminaire 1100 may include a digital-to-analog converter (DAC) 1180. DAC 1180 may be configured as typically done, and in some example embodiments may be configured to convert a digital control signal into an analog control signal to be applied to a given solid-state light source 1110 of the host LCom-enabled luminaire 1100 to output an LCom signal therefrom. Note that DAC 1180 may further be integrated into controller 1150, in some embodiments. Other suitable configurations will be apparent in light of this disclosure.

In accordance with some embodiments, a given LCom-enabled luminaire 1100 may include one or more sensors 1160. In some embodiments, a given LCom-enabled luminaire 1100 optionally may include an altimeter 1161. When included, altimeter 1161 may be configured as typically done, and in some example embodiments may be configured to aid in determining the altitude of a host LCom-enabled luminaire 1100 with respect to a given fixed level (e.g., a floor, a wall, the ground, or other surface). In some embodiments, a given LCom-enabled luminaire 1100 optionally may include a geomagnetic sensor 1163. When included, geomagnetic sensor 1163 may be configured as typically done, and in some example embodiments may be configured to determine the orientation and/or movement of a host LCom-enabled luminaire 1100 relative to a geomagnetic pole (e.g., geomagnetic north) or other desired heading, which may be customized as desired for a given target application or end-use. In some embodiments, a given LCom-enabled luminaire 1100 optionally may include an ambient light sensor 1165. When included, ambient light sensor 1165 may be configured as typically done, and in some example embodiments may be configured to detect and measure ambient light levels in the surrounding environment of the host LCom-enabled luminaire 1100. In some cases, ambient light sensor 1165 may be configured to output a signal, for example, to a multiplier 1176 of LCom-enabled luminaire 1100. In some embodiments, a given LCom-enabled luminaire 1100 optionally may include a gyroscopic sensor 1167. When included, gyroscopic sensor 1167 may be configured as typically done, and in some example embodiments may be configured to determine the orientation (e.g., roll, pitch, and/or yaw) of the host LCom-enabled luminaire 1100. In some embodiments, a given LCom-enabled luminaire 1100 optionally may include an accelerometer 1169. When included, accelerometer 1169 may be configured as typically done, and in some example embodiments may be configured to detect motion of the host LCom-enabled luminaire 1100. In any case, a given sensor 1160 of a given host LCom-enabled luminaire 1100 may include mechanical and/or solid-state componentry, as desired for a given target application or end-use. Also, it should be noted that the present disclosure is not so limited only to these example optional sensors 1160, as additional and/or different sensors 1160 may be provided as desired for a given target application or end-use, in accordance with some other embodiments, or no sensors 1160 may be provided, as the case may be. Numerous configurations will be apparent in light of this disclosure.

In accordance with some embodiments, a given LCom-enabled luminaire 1100 may include a communication module 1170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 1170 may be a transceiver or other network interface circuit configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 1170, as desired for a given target application or end-use. In some instances, communication module 1170 may be configured to facilitate inter-luminaire communication between LCom-enabled luminaires 1100. In addition or alternatively, communication module 1170 may be configured so as to allow for receipt of information from network 3000, such as luminaire position data. Whether the luminaire position data is stored within the luminaire or received from somewhere else, the luminaire position data can then be used to generate the LCom signals emitted by that luminaire 1100 to communicate luminaire position to passing vehicles 90. The communication module 1170 may be configured to use any suitable wired and/or wireless transmission technologies (e.g., radio frequency, or RF, transmission; infrared, or IR, light modulation; etc.), as desired for a given target application or end-use. These transmission technologies may be implemented with a transceiver, for example a Bluetooth Beacon, integrated with or connected to the communications module 1170. Other suitable configurations for communication module 1170 will depend on a given application and will be apparent in light of this disclosure.

Figure 12:
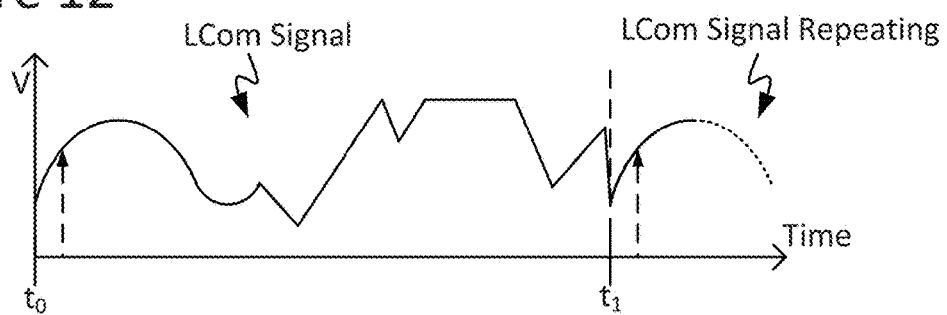
FIG. 12 illustrates an example arbitrary LCom signal as may be transmitted by an LCom-enabled luminaire, in accordance with an embodiment of the present disclosure.

As previously noted, a given LCom-enabled luminaire 1100 may be configured, in accordance with some embodiments, to output light and/or light encoded with LCom data (e.g., an LCom signal). FIG. 12 illustrates an example arbitrary LCom signal as may be transmitted by an LCom-enabled luminaire 1100, in accordance with an embodiment of the present disclosure. As can be seen here, LCom-enabled luminaire 1100 may be configured to transmit a given LCom signal over a given time interval ($t_1-t_0$). In some cases, a given LCom-enabled luminaire 1100 may be configured to repeatedly output its one or more LCom signals.

Network 3000 can be any suitable public and/or private communications network. For instance, in some cases, network 3000 may be a private local area network (LAN) operatively coupled to a wide area network (WAN), such as the Internet. In some cases, network 3000 may include one or more second-generation (2G), third-generation (3G), and/or fourth-generation (4G) mobile communication technologies. In some cases, network 3000 may include a wireless local area network (WLAN) (e.g., Wi-Fi wireless data communication technologies). In some instances, network 3000 may include Bluetooth wireless data communication technologies. In some cases, network 3000 may include supporting infrastructure and/or functionalities, such as a server and a service provider (e.g., computer system 3010), but such features are not necessary to carry out communication via network 3000. In some instances, vehicle 90 may be configured for communicative coupling, for example, with a network 3000 and one or more LCom-enabled luminaires 1100. In some cases, vehicle 90 may be configured to receive data from network 3000, for example, which serves to supplement LCom data received by vehicle 90 from a given LCom-enabled luminaire 1100. In some instances, vehicle 90 may be configured to receive data (e.g., such as known reference position information, luminaire position, luminaire identifiers, and/or other data pertaining to a given LCom-enabled luminaire 1100) from network 3000 that facilitates navigation via one or more LCom-enabled luminaires 1100. Numerous configurations for network 3000 will be apparent in light of this disclosure.

Figure 13A:
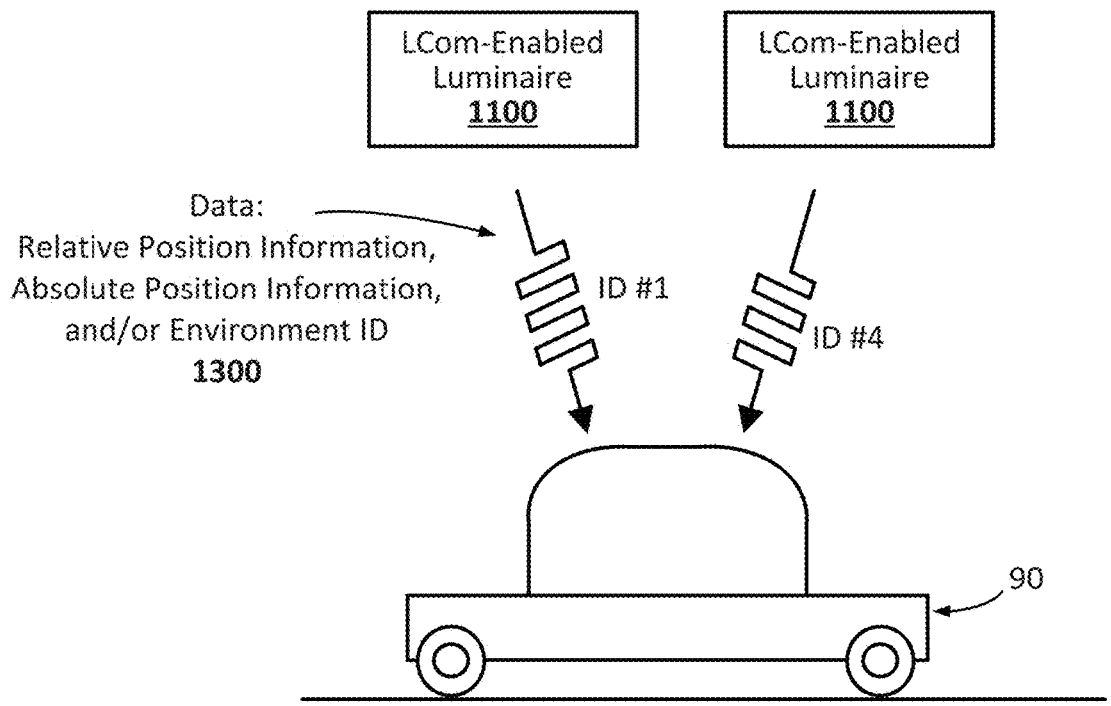
FIG. 13A illustrates an example LCom system, including an LCom-enabled luminaire and a vehicle, in accordance with an embodiment of the present disclosure.

FIG. 13A illustrates an example LCom system, including an LCom-enabled luminaire and a vehicle, in accordance with an embodiment of the present disclosure. As can be seen, this example scenario includes two luminaires 1100 each communicating with a vehicle 90, which happens to be running an LCom-based navigation application. The navigation application can be, for instance, one of the applications stored in memory 220 and executed by a processor 216. As can be further seen, the LCom signals being communicated include data 1300, which generally includes position information, which may be used to navigate. For instance, if the user is receiving light from a specific luminaire 1100 that has a known location, then the navigation application 'knows' where the user is and can continue to guide the user along the targeted path.

Data 1300, such as position information, transmitted by the luminaires 1100 may come in any number of forms. For instance, in some embodiments, the luminaire positions may be communicated as a relative position (e.g., relative to another luminaire 1100, or some other object having a known position), and/or as an absolute position (e.g., x-y coordinates of a grid-based map). In still other embodiments, the luminaire position may be communicated as an environment ID, wherein the transmitted ID translates to a specific location on a given map of the environment being navigated. In some such example cases, for instance, a luminaire might use dual tone multi frequency (DTMF) encoding, which means it continuously sends two unique frequencies.

Figure 13B:
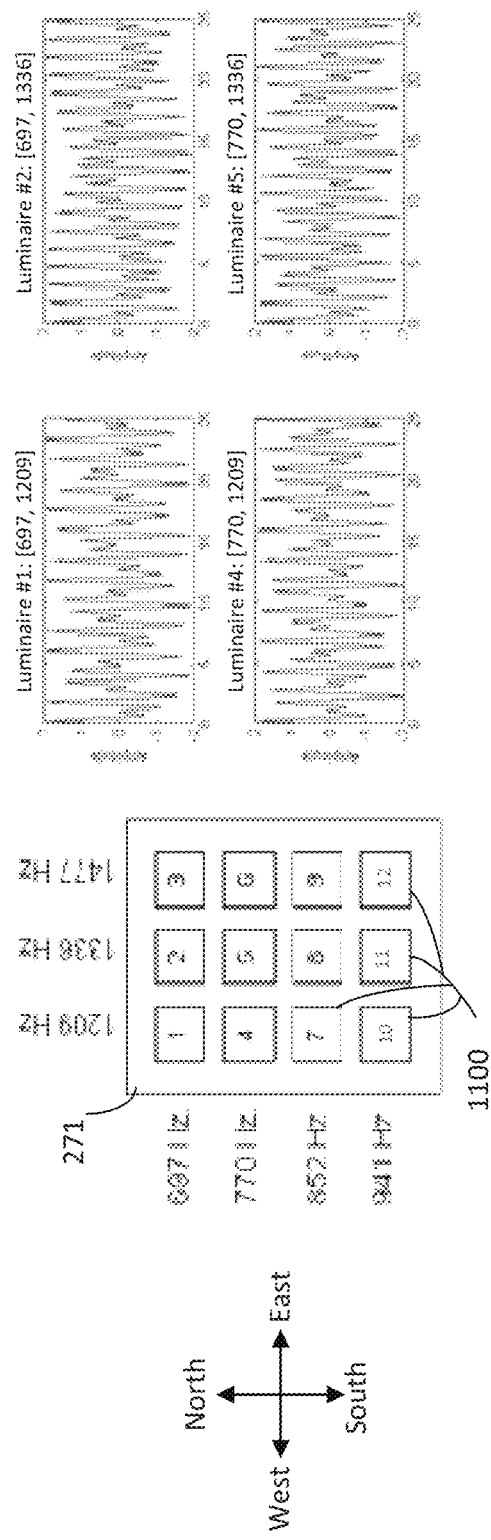
FIG. 13B illustrates an example graphical map of LCom-enabled luminaires deployed in a given venue, and corresponding LCom transmissions indicating the location of that particular luminaire within the venue, in accordance with an embodiment of the present disclosure.

FIG. 13B shows how an example DTMF-based ID system might work. As can be seen, a given environment 271 is the area being navigated and has a number of LCom-enabled luminaires 101. The environment 271 may be, for example, a super market or retail store, or a shopping mall, or a parking garage, or a large office space, to name a few examples. The environment 271 is effectively divided into a grid of physical locations, each location being associated with at least one luminaire 1100. As can be further seen, each luminaire 1100 is associated with two unique frequencies that it can transmit on a regular basis. The two unique frequencies can thus be used to correlate that particular luminaire's position to a specific location within the environment. For instance, if the user is receiving light from luminaire #1 (which transmits 697 Hz and 1209 Hz in this example embodiment), then the navigation application 'knows' that the user is in the North-West corner of the environment 271; similarly, if the user is receiving light from luminaire #12 (which transmits 941 Hz and 1477 Hz in this example embodiment), then the navigation application 'knows' that the user is in the South-East corner of the environment; and so on. So, in one example scenario, assuming that environment 271 is a store selling goods of some kind, each location can be associated with a specific product or range of products. Thus, a user can be led to a given product location by the navigation application, according to some embodiments. Note that the entire frequency-based grid can be scaled to higher or lower frequencies and still operate as described here to uniquely identify the location of individual luminaires 1100.

Figure 13C:
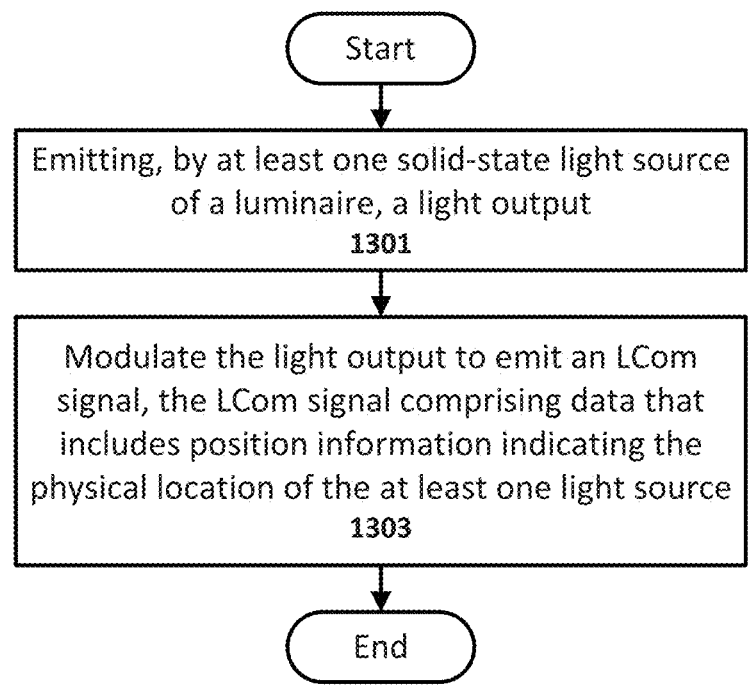
FIG. 13C illustrates an example method for emitting position information from an LCom-enabled luminaire, in accordance with an embodiment of the present disclosure.

FIG. 13C illustrates an example method for emitting position information from an LCom-enabled luminaire, in accordance with an embodiment of the present disclosure. As can be seen, the method includes emitting 1301, by at least one solid-state light source of a luminaire, a light output. The method further includes modulating 1303 the light output to emit an LCom signal, the LCom signal comprising data that includes position information indicating the physical location of the at least one light source. According to some embodiments, this position information may indicate that particular luminaire's location directly by virtue of relative or absolute position information, as previously explained. In other embodiments, this position information may indicate that particular luminaire's location indirectly by virtue of an environment ID that translates to a specific location on a given map of the environment being navigated. Numerous other embodiments and variations for using luminaire locations to navigate a given area will be apparent in light of this disclosure.

Example Methods for Determining Vehicle Position with VLC Signals

Figure 14:
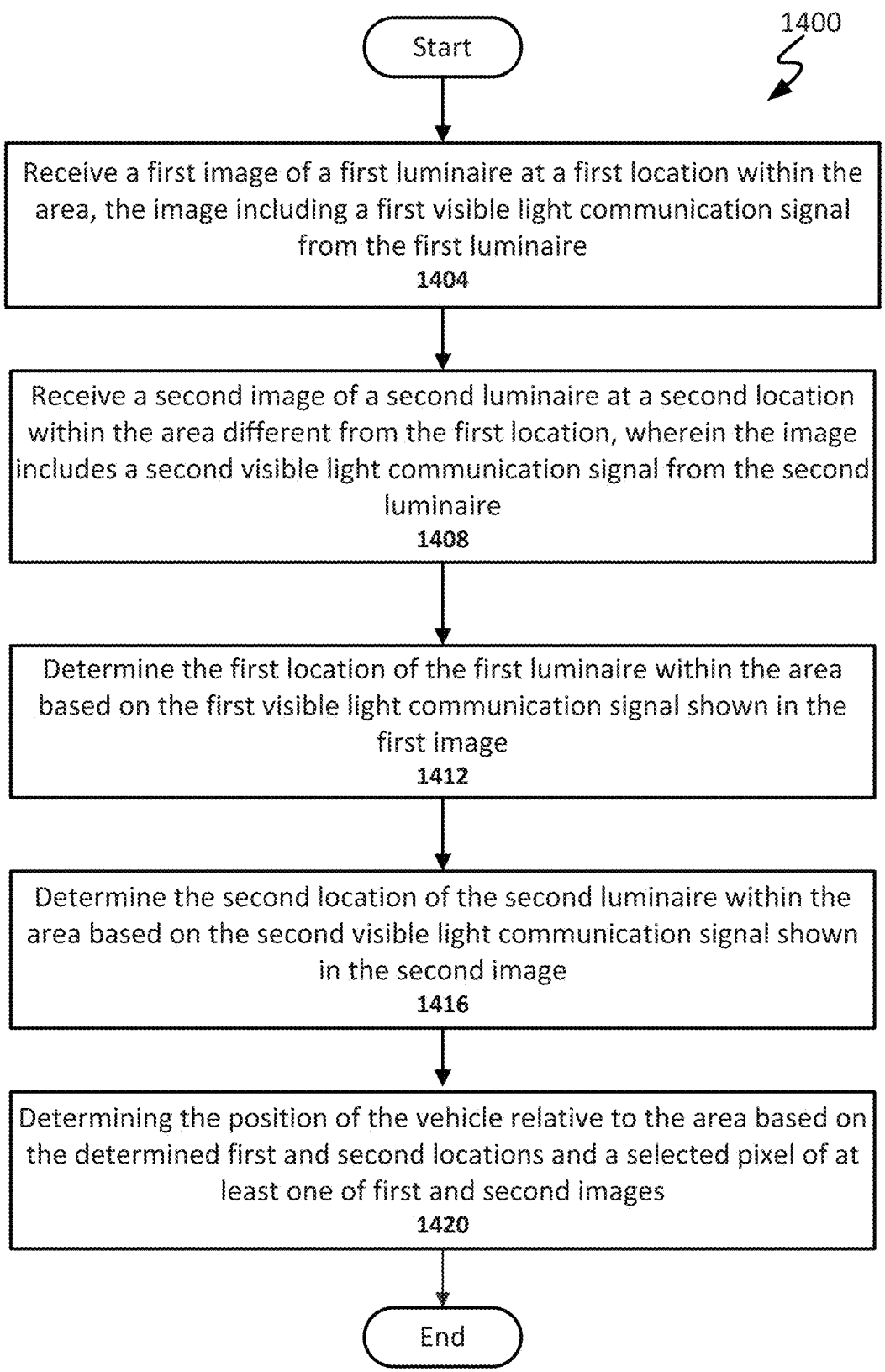
FIG. 14 is a flowchart of an example method for determining a position of a vehicle within an area, in accordance with an embodiment of the present disclosure.

FIG. 14 is a flow chart of an example method 1400 for determining a position of a vehicle within an area, in accordance with an embodiment of the present disclosure. The method 1400 includes receiving 1404 a first image of a first luminaire at first location within the area, the first image including a first visible light communication signal from the first luminaire. A visible light communication (VLC) signal is a light-based signal emitted or otherwise transmitted by modulating light sources of the luminaire. In an example embodiment, the first luminaire transmits a VLC signal by modulating its light sources to transmit light at a lower light intensity level (e.g., 95% of a maximum light intensity level). The VLC signal is encoded with a luminaire identifier, such as an identification number, which in turn can be used for determining a location of a given luminaire within the area, as described further herein.

Figure 15:
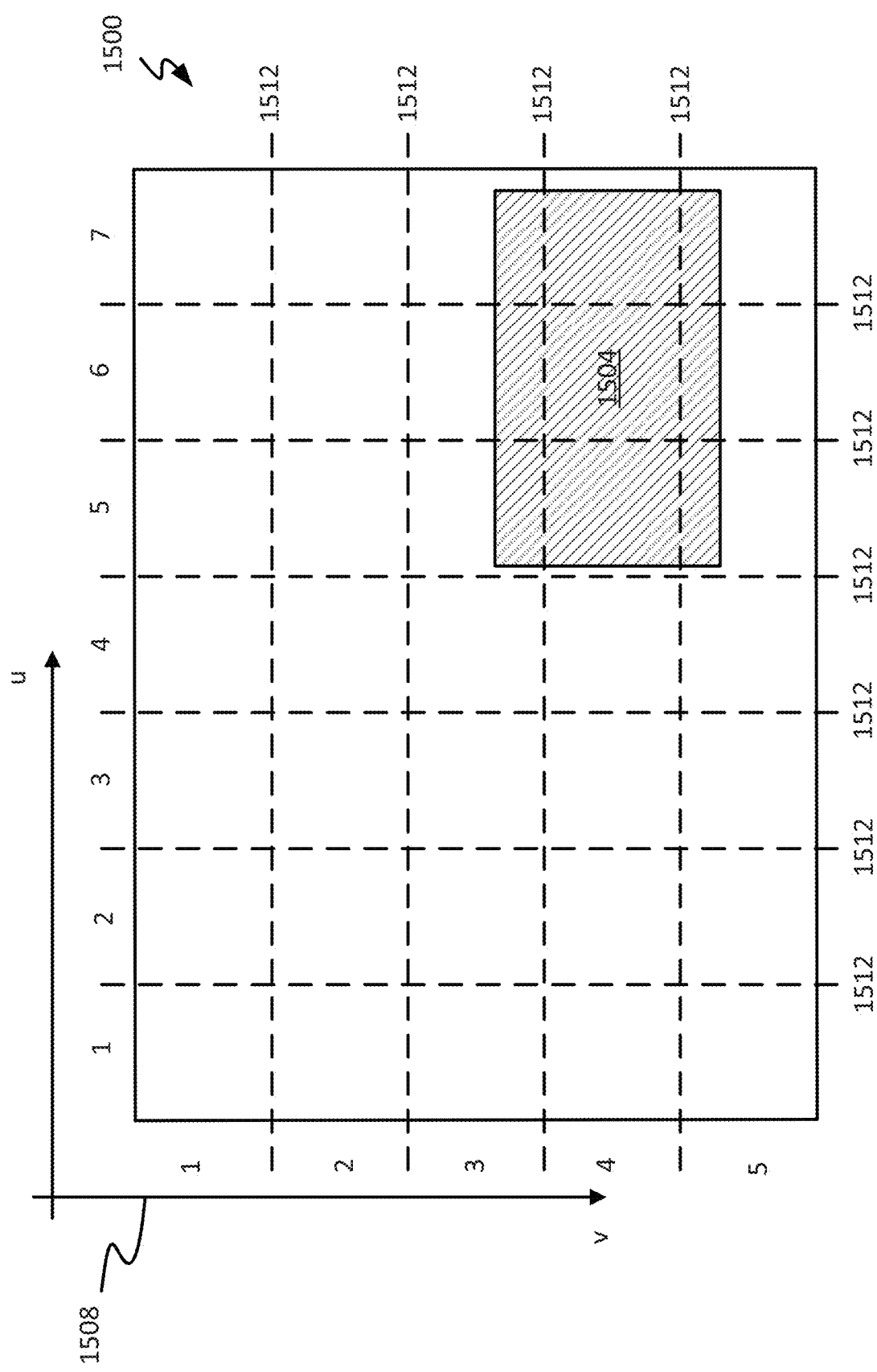
FIG. 15 is a schematic view of an image of the area, the image including a luminaire and having a coordinate system, in accordance with an embodiment of the present disclosure.

As the vehicle passes through the area, the sensor disposed on the vehicle records or otherwise processes images of the area within the FOV of the sensor. Objects, such as luminaires, in the FOV of the sensor are recorded and shown by one or more pixels of the image. This is illustrated in FIG. 15, in which an image 1500 includes luminaire 1504. In image 1500, each pixel is represented by a pair of indices (u, v) of an image coordinate system 1508 (e.g., the u-v coordinate system). In example embodiment, the vehicle includes a sensor, such as a camera, having a resolution of 640 by 480. For illustrative purposes, FIG. 15 depicts image 1500 with a resolution of 5 by 7 as shown by grid lines 512. As a result, the pixels of the image 1500 are indexed with numbers 1 to 7 going from left to right along the u-direction of the image coordinate system 1508. In a similar fashion, the pixels of the image 1500 are indexed with numbers 1 to 5 going from the top to bottom along a v-direction of the image coordinate system 1508. A particular pixel of the image 1500, thus, can be identified using a coordinate location (u, v) based on the image coordinate system 1508, for example the pixel representing the center of the image 1500 is identified as pixel (4, 3). In some cases, the image 1500 may include more than one luminaire 1504 depending on the arrangement of the luminaires and/or FOV of a given sensor. The image 1500 also includes a VLC signal (as indicated by the shaded box) for the luminaire 1504, which in turn can be decoded or otherwise processed to determine luminaire position, as described further herein.

The method 1400 further includes receiving 1408 a second image of a second luminaire at a second location within the area different from the first location, wherein the image includes a second visible light communication signal from the second luminaire. The second image of a second luminaire can be received in a similar fashion as the first received image. In some embodiments, the vehicle may move to another position within the area to receive the second image. The locations of the first and second luminaires are located within the area, such that the system can determine a vehicle orientation relative to the area based on the first and second luminaire locations, as described further herein.

The method 1400 further includes determining 1412 a first location of a first luminaire within the area based on the first visible light communication signal shown in the first image. With the first image received, the system is configured to determine a location of the first luminaire. In an example embodiment, the system is configured to identify the pixels within the first image corresponding to the first luminaire from other pixels corresponding to background objects, for example a ceiling located above the floor. To distinguish among image pixels, the system, in an example embodiment, is configured to scan or otherwise analyze the first image in one of two ways, globally (e.g., scan an entire image) or locally (e.g., within an area or region of interest). The first image is analyzed globally to enable the system to distinguish between pixels associated with the first luminaire and from other pixels related to background objects. The system is configured to identify pixels associated with the first luminaire based on a pixel intensity values and a threshold. A pixel light intensity value is a number that indicates level of light for a given pixel of an image. A threshold is a pixel intensity value that can be used to distinguish between pixels associated with a luminaire and pixels corresponding to background objects. In an example embodiment, the threshold is a pixel intensity value that corresponds to a minimum light intensity value associated with a pixel of the first luminaire. Comparing the pixel intensity values for each pixel with the threshold, the system can identify the pixels of the first image that correspond to the first luminaire.

With the image pixels for the first luminaire identified, the system is further configured to perform a local scan of those pixels to select a pixel to represent the first luminaire. The image is further analyzed locally (e.g., analyzing area of interest) to determine luminaire position data (e.g., a luminaire identifier) from a sub-set of pixels of the received image. In an example embodiment, the system is configured to analyze a sub-set of image pixels corresponding to the first luminaire. The sub-set of image pixels, in some embodiments, corresponds to a 2 by 8 pixel region of the image. The system is configured to scan the sub-set of image pixels at a frame exposure rate, for example 8 Kilo-Hertz (KHz), to identify a luminaire identifier (e.g., an identification number) based on a light intensity value of the pixels.

Once identified, the luminaire identifier can be used to determine a location of the first luminaire within the area. In an example embodiment, the luminaire identifier is combined with luminaire layout information, such as look-up tables, maps, and database content, stored locally (e.g., in the memory of the vehicle) and/or globally (e.g., in the memory of the computing system) to determine a coordinate position (e.g., (x, y)) of the first luminaire. Numerous other configurations will be apparent in light of this disclosure.

The method 1400 further includes determining 1416 a second location of a second luminaire within the area based on the second visible light communication signal shown in the second image. In response to receiving a second image, the system is configured to determine the second location of the second luminaire in a similar fashion as previously described for the first luminaire. In turn, the determined luminaire locations can be used to determine: (1) an orientation of the vehicle relative to the area and (2) a coordinate position of the vehicle within the area, as described herein.

The method 1400 includes determining 1420 the position of the vehicle relative to the area based on a pixel for at least one of first and second images and the determined first and second locations. The system is configured to determine a coordinate location (e.g., (x, y) coordinate) for the vehicle within the area. In an example embodiment, a coordinate location is determined based on: (1) a pixel of the image corresponding to a given luminaire and (2) a first and second angle associated with pixel location within the image for that pixel. The pixel of the image corresponding to the luminaire can be selected in a number of ways. For instance, in some embodiments, a pixel is selected that corresponds to a pixel location representing the center of mass of the luminaire shown in the image. This illustrated in FIG. 15, in which the pixel located at u-v coordinate position (6, 4) is selected as the pixel corresponding to a center of mass for the luminaire 1504 shown in the image 1500. Other ways of selecting a pixel corresponding to the luminaire shown in the image may include selecting the pixel having the greatest light intensity level and/or located at a center pixel location within the luminaire shown in the image. In a more general sense, any one of the pixels corresponding to the luminaire shown in the image can be used to determine a vehicle position relative to the luminaire.

Once identified, the pixel location of the selected pixel is used to identify a first angle and a second angle. In general, pixels located at the same pixel locations within different images can be associated with the same first and second angles relative to an image plane for the sensor. In an example embodiment, the system is configured to associate a horizontal angle $\alpha$ and a vertical angle $\beta$ with each pixel of the image. In turn, the system is configured to determine a vehicle position relative to the area (e.g., a coordinate position) based on the selected pixel corresponding to the luminaire shown in the image and first and second angles associated with a pixel location of the selected pixel.

The first and second angles for each pixel location within the image are determined based on a calibration process for the system. The calibration process, in some embodiments, is accomplished by generating images of luminaires at known distances and calculating the angles, such as angles $\alpha$ and $\beta$, for each pixel location within the received images. Once calculated, the first and second angles are assigned a pixel location within an image. The calculated angles and corresponding pixel locations are stored or otherwise made accessible to the system. In response to generating an image, the system is configured to map or otherwise associate two angles with each pixel location of the received image. Using the selected pixel and the first and second angles (e.g., angles $\alpha$ and $\beta$), the system is configured to determine vehicle position relative to the area, as further described herein.

Figure 16A:
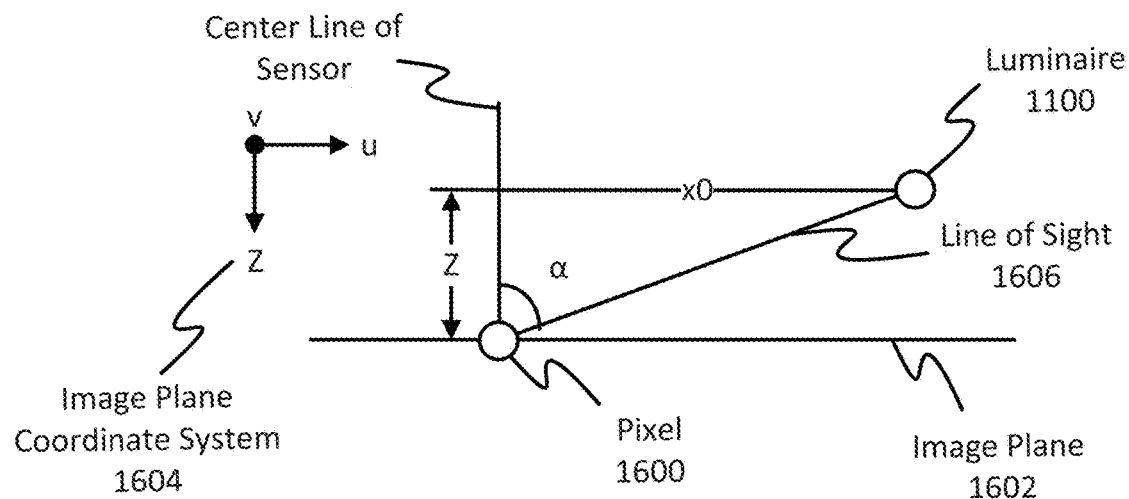
FIG. 16A is a schematic side view of the area illustrating a first angle associated with a pixel of the sensor, in accordance with an embodiment of the present disclosure.

FIG. 16A is a schematic side view of the area illustrating a first angle associated with a pixel 1600 of the sensor, in accordance with an embodiment of the present disclosure. The selected pixel of the received image corresponds to a pixel 1600 of the sensor. In turn, pixel 1600 is used to select a first angle, such as horizontal angle $\alpha$. Horizontal angle $\alpha$ is a known angle resulting from the calibration process, previously described. As can be seen, pixel 1600 is located within an image plane 1602. From the image plane 1602 there is a line of sight 1606 from the pixel 1600 to the luminaire 1100. Horizontal angle $\alpha$, is located between the line of sight 1606 and a centerline of the sensor. Located along the z-direction of the image plane coordinate system 1604 is a distance Z. Distance Z is a known distance from the sensor to the luminaire 1100, because the vehicles are located at a constant distance from the luminaires 1100. Distance x0 represents a ground distance along the floor relative to the area, for example in an x-direction of FIG. 1B, between a perpendicular projection from the luminaire 1100 to the floor of the area and a perpendicular projection of the center line of the sensor in the z-direction. Using distance Z along with the horizontal angle $\alpha$ for a given pixel location of the sensor that corresponds to a selected pixel of the received image, distance x0 is determined along the u-direction relative to the image plane 1602 using the following:

$$\frac{x0}{Z} = \tan(\alpha) \qquad \text{Equation (14)}$$

$$x0 = Z \times \tan(\alpha) \qquad \text{Equation (15)}$$

Figure 16B:
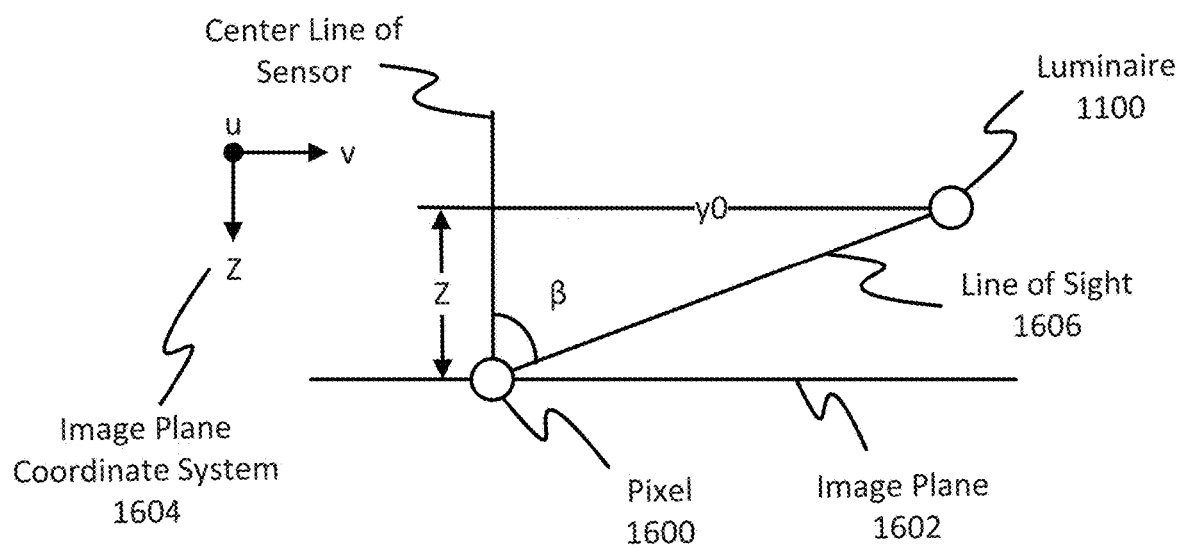
FIG. 16B is a schematic side view of the area illustrating a second angle associated with a pixel of the sensor, in accordance with an embodiment of the present disclosure.

FIG. 16B is a schematic side view of the area illustrating a second angle associated with a pixel 1600 of the sensor, in accordance with an embodiment of the present disclosure. Note that coordinate system 1604 is rotated 90 degrees from the view shown in FIG. 16A. The system is configured to determine a distance y0 in a similar fashion as done for distance x0, previously described. Distance y0 represents a ground distance along the floor relative to the area, for example in a y-direction of FIG. 1B, between perpendicular projections, as previously described, that are shifted 90 degrees. Using distance Z and the known vertical angle $\beta$ for the given pixel location, the distance y0 is determined as follows:

$$\frac{y0}{Z} = \tan(\beta) \qquad \text{Equation (14)}$$

$$y0 = Z \times \tan(\beta) \qquad \text{Equation (15)}$$

To determine the vehicle orientation relative to the area, the system is configured to determine multiple distances (e.g., x0 and y0 distances) from different luminaires within the area. These multiple distances can be combined with the locations of the known luminaires within the area to determine vehicle orientation relative to the area. For instance, x0 and y0 distances determined from for a single luminaire results in at least two possible positions of the vehicle relative the area. By determining additional x0 and y0 distances from different luminaires within the area, the system is configured to determine a unique combination of x0 and y0 distances for a given number of luminaires and determined luminaire locations which indicate vehicle orientation relative to the area.

Further Considerations

Numerous other configurations will be apparent in light of this disclosure. For example, in some embodiments of the present disclosure, the system is configured to identify multiple luminaires from a single received image. In such an embodiment, multiple luminaires are within the FOV of the sensor, such that received image includes multiple luminaires. The system is configured to determine the presence of more than one luminaire within an image based on pixel locations of pixels having light intensity values equal to or greater than the threshold value, as previously described herein. For instance, the system can identify groups of pixels having different pixel locations, but with light intensity values indicating the presence of a luminaire. In response, the system is configured to determine the identity of each luminaire within the received image using a sequential scheme. In some embodiments, the sequential scheme determines luminaire identity based on pixel location. For example, system can select a group of pixels located nearest one side of the image (e.g., the left hand side) and decode the VLC signal associated with those pixels first. The system can continue identifying groups of pixels corresponding to a luminaire until the opposing side of the image is reached. In some embodiments, the system may select groups of pixels going from top to bottom across an image. With multiple luminaires identified within a signal image, the system is configured to determine luminaire locations for each luminaire shown in the image, as previously described. The determined luminaire locations are used to determine a vehicle position and orientation relative to the area, as previously described.

In other embodiments of the present disclosure, the system further includes backup systems, such as radio-frequency (RF) system, to maintain and/or improve system performance. In some such embodiments, the RF system provides enhanced communications when the VLC signals provide limited or poor accuracy, for example when a luminaire failure occurs. In such an instance, a RF transmitter, for example a RF Beacon, transmits a luminaire identifier for a given luminaire. In response, the system is configured to determine the identity of the luminaire using luminaire position data from the RF signal and luminaire layout information.

In other embodiments, the system is configured to measure RF signal strength. In such embodiments, luminaire layout information includes locations within the area corresponding to RF signal strengths. RF signal strengths can be measured using a recorder and provided to the system in the form of RF signal information. RF signal information such as signal strength can be used to efficiently and accurately determine a vehicle location within the area. In operation, the vehicle measures signal strength of a received RF signal. In turn, the vehicle transmits a request to the system to determine a vehicle location (e.g., (x, y) coordinate location) in the area based on signal strength of the received RF signal and RF signal information for the area.

In other instances, enhanced system performance can be achieved using both VLC and RF communications. In some embodiments, for example, the RF system can be used to perform a self-test to ensure the accuracy of the VLC communications. In such embodiments, vehicle position is determined using both VLC and RF signal data. The determined vehicle positions are compared to one another to identify discrepancies in the determined vehicle positions. For example, if the determined vehicle positions are within a given tolerance (e.g., 10 centimeters), then no discrepancy is identified. If the vehicle positions are not within the given tolerance range, then the system is configured to further investigate the cause of the discrepancy.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method for determining a position of a vehicle within an area, the method comprising:
   receiving an image of an asymmetric fiducial pattern displayed by a luminaire within the area, wherein:
   the luminaire comprises a plurality of light sources;
   when the luminaire is in illumination mode, the plurality of light sources are configured to emit a maximum light output; and
   when the luminaire is in messaging mode, the plurality of light sources are configured to emit light output of varying intensity to display the asymmetric fiducial pattern;
   determining a coordinate position of the luminaire based on the received image of the asymmetric fiducial pattern displayed by the luminaire;
   determining an orientation of the vehicle relative to the area based on an orientation of the asymmetric fiducial pattern in the received image; and
   determining the position of the vehicle relative to the area based at least in part on the determined coordinate position of the luminaire.

2. The method of claim 1, wherein determining the position of the vehicle relative to the area is based at least in part on a vehicle position relative to the luminaire.

3. The method of claim 1, wherein determining the position of the vehicle within the area is based on a single received image of the asymmetric fiducial pattern displayed by the luminaire.

4. The method of claim 1, wherein determining the orientation of the vehicle relative to the area comprises associating an asymmetry of the asymmetric fiducial pattern with a direction relative to the area.

5. The method of claim 1, wherein determining the coordinate position of the luminaire within the area is based on a luminaire identifier obtained from the received image of the asymmetric fiducial pattern.

6. The method of claim 1, wherein determining the position of the vehicle relative to the luminaire includes converting the determined coordinate position of the luminaire from a three-dimensional coordinate position into a two-dimensional position.

7. The method of claim 6, wherein the position of the vehicle relative to the luminaire is converted from the three-dimensional coordinate position into the two-dimensional position by projecting a point from the three-dimensional coordinate position of the luminaire onto an image plane of a sensor and along a line of projection from the three-dimensional coordinate position of the luminaire to the sensor.

8. A system for determining a position of a vehicle within an area, the system comprising:
   a luminaire within the area, the luminaire including a plurality of light sources configured to display an asymmetric fiducial pattern, wherein:
   the asymmetric fiducial pattern indicates an orientation of the luminaire relative to the area;
   when the luminaire is in illumination mode, the plurality of light sources are configured to emit a maximum light output; and
   when the luminaire is in messaging mode, the plurality of light sources are configured to emit light output of varying intensity to display the asymmetric fiducial pattern;
   a sensor disposed on the vehicle, the sensor configured to receive an image of the asymmetric fiducial pattern; and
   a processor configured to:
   determine a location of the luminaire within the area based on a received image of the asymmetric fiducial pattern,
   determine an orientation of the vehicle relative to the area based on the received image of the asymmetric fiducial pattern, and
   determine a position of the vehicle within the area based at least in part on the determined location of the luminaire and the determined orientation of the vehicle relative to the area.

9. The system of claim 8, wherein the position of the vehicle within the area is based at least in part on a vehicle position relative to the luminaire.

10. The system of claim 8, wherein the vehicle is an autonomous vehicle that is configured to navigate through the area using images of asymmetric fiducial patterns displayed by luminaires.

11. The system of claim 8, wherein the asymmetric fiducial pattern is associated with a luminaire identifier, such that the processor can decode the pattern based on light intensity values of one or more pixels of the received image to determine the luminaire identifier.

12. The system of claim 8, wherein the processor is further configured to associate an asymmetry of the asymmetric fiducial pattern with a direction relative to the area.

13. The system of claim 8, wherein the luminaire includes a combination of infrared light sources and visible light sources, such that the asymmetric fiducial pattern is displayed using the infrared light sources and the area is illuminated using the visible light sources.

14. The system of claim 8, further comprising a computing system in communication with at least one of a plurality of luminaires and the vehicle via a network.

15. The system of claim 8, wherein the processor determines a position of the vehicle within the area based on a single image of the asymmetric fiducial pattern.

\* \* \* \* \*